United States Patent
Walton et al.

(10) Patent No.: US 7,302,009 B2
(45) Date of Patent: *Nov. 27, 2007

(54) BROADCAST TRANSMISSION WITH SPATIAL SPREADING IN A MULTI-ANTENNA COMMUNICATION SYSTEM

(75) Inventors: Jay Rodney Walton, Carlisle, MA (US); John W. Ketchum, Harvard, MA (US); Mark S. Wallace, Bedford, MA (US); Steven J. Howard, Ashland, MA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/009,824

(22) Filed: Dec. 9, 2004

(65) Prior Publication Data

US 2005/0157806 A1  Jul. 21, 2005

Related U.S. Application Data

(60) Provisional application No. 60/530,860, filed on Dec. 17, 2003.

(51) Int. Cl.
H04B 7/02 (2006.01)

(52) U.S. Cl. ............... 375/267; 375/299; 375/130; 455/101

(58) Field of Classification Search ........... 375/267, 375/299, 260, 295, 296, 130; 370/203, 204; 455/101

See application file for complete search history.

(56) References Cited

U.S. PATENT DOCUMENTS 6,198,775 B1  3/2001  Khayrallah et al. ......... 375/265
6,940,917 B2 *  9/2005  Menon et al. ............... 375/267

(Continued)

FOREIGN PATENT DOCUMENTS

EP  1009124 A2 *  6/2000

(Continued)

OTHER PUBLICATIONS

A. Agustin et al, "LDC Construction with a Defined Structure", Oct. 6, 2003, pp. 433-437.

(Continued)

*Primary Examiner*—Temesghen Ghebretinsae
(74) *Attorney, Agent, or Firm*—Thomas R. Rouse; Ross L. Franks; Thien T. Nguyen

(57) ABSTRACT

An access point in a multi-antenna system broadcasts data using spatial spreading to randomize an "effective" channel observed by each user terminal for each block of data symbols broadcast by the access point. At the access point, data is coded, interleaved, and modulated to obtain $N_D$ data symbol blocks to be broadcast in $N_M$ transmission spans, where $N_D \geq 1$ and $N_M > 1$. The $N_D$ data symbol blocks are partitioned into $N_M$ data symbol subblocks, one subblock for each transmission span. A steering matrix is selected (e.g., in a deterministic or pseudo-random manner from among a set of L steering matrices) for each subblock. Each data symbol subblock is spatially processed with the steering matrix selected for that subblock to obtain transmit symbols, which are further processed and broadcast via $N_T$ transmit antennas and in one transmission span to user terminals within a broadcast coverage area.

22 Claims, 12 Drawing Sheets

U.S. PATENT DOCUMENTS

2003/0016637 A1    1/2003   Khayrallah et al. ......... 370/329
2003/0112745 A1*   6/2003   Zhuang et al. ............... 370/208
2004/0081263 A1*   4/2004   Lee et al. .................... 375/347

FOREIGN PATENT DOCUMENTS

EP             1223702 A1 *   7/2002

OTHER PUBLICATIONS

Yingxue Li, et al, "Transmit Diversity Over Quasi-Static Fading Channels Using Multiple Antennas and Random Signal Mapping," IEEE Trans. on Comm, vol. 51, No. 11, Nov. 2003.

A. Goldsmith, et al, "Capacity Limits of MIMO Channels," IEEE JSAC, vol. 21, No. 5, Jun. 2003.

Huan Yao, "Efficient Signal, Code and Receiver Designs for MIMO Communications Systems," PhD Thesis, Massachusetts Institute of Technology, 2003.

T.L. Marzetta, B. Hassibi, B.M. Hochwald, "Structured Unitary Space-Time Autocoding Constellations," IEEE Trans. on IT, vol. 48, No. 4, Apr. 2002.

W. Yu and J.M. Cioffi, "Trellis Precoding for the Broadcast Channel," Proc. Global Communications Conf., Oct. 2001, pp. 1344-1348.

F. R. Farrokhi, et al., "Link-Optimal Space-Time Processing with Multiple Transmit and Receive Antennas," IEEE Comm. Letters, vol. 5, No. 3, Mar. 2001.

B.M Hochwald, et al, "Systematic Design of Unitary Space-Time Constellations," IEEE Trans. on IT, vol. 46, No. 6, Sep. 2000.

B. M. Hochwald and T.L. Marzetta, "Unitary Space-Time Modulation for Multiple-Antenna Communications in Rayleigh Flat Fading," IEEE Trans. on IT, vol. 46, No. 2, Mar. 2000.

S. M. Alamouti, "A Simple Transmit Diversity Technique for Wireless Communications," IEEE JSAC, vol. 16, pp. 1451-1458, Oct. 1998.

* cited by examiner

BROADCAST TRANSMISSION WITH SPATIAL SPREADING IN A MULTI-ANTENNA COMMUNICATION SYSTEM

CLAIM OF PRIORITY UNDER 35 U.S.C. §119

The present application for patent claims priority to Provisional Application Ser. No. 60/530,860, entitled "Broadcast Transmission with Pseudo-Random Transmit Steering in a Multi-Antenna Communication System," filed Dec. 17, 2003, and assigned to the assignee hereof and hereby expressly incorporated by reference herein.

REFERENCE TO CO-PENDING APPLICATIONS FOR PATENT

The present application for patent is related to the following co-pending U.S. patent applications:

"Spatial Spreading in a Multi-Antenna Communication System" by Walton et al., having Ser. No. 11/008,865, assigned to the assignee hereof, and expressly incorporated by reference herein; and "Data Transmission with Spatial Spreading in a MIMO Communication System" by Walton et al., having Ser. No. 11/009,200, and expressly incorporated by reference herein;

BACKGROUND

1. Field

The present invention relates generally to communication, and more specifically to techniques for broadcasting data in a multi-antenna communication system.

2. Background

A multi-antenna communication system employs multiple transmit antennas at a transmitting entity and one or more receive antennas at a receiving entity for data transmission. The multi-antenna communication system may thus be a multiple-input multiple-output (MIMO) system or a multiple-input single-output (MISO) system. A MIMO system employs multiple ($N_T$) transmit antennas and multiple ($N_R$) receive antennas for data transmission. A MIMO channel formed by the $N_T$ transmit antennas and the $N_R$ receive antennas may be decomposed into $N_S$ spatial channels, where $N_S \leq \min\{N_T, N_R\}$. The $N_S$ spatial channels may be used to transmit data in a manner to achieve greater reliability and/or higher overall throughput. A MISO system employs multiple ($N_T$) transmit antennas and a single receive antenna for data transmission. A MISO channel formed by the $N_T$ transmit antennas and the single receive antenna is composed of a single spatial channel.

An access point in a MIMO system may broadcast data to a number of multi-antenna user terminals, which may be distributed throughout the coverage area of the access point. A different MIMO channel is formed between the access point and each of these user terminals. Each MIMO channel may experience different channel conditions (e.g., different fading, multipath, and interference effects). Consequently, the spatial channels of each MIMO channel may achieve different signal-to-noise-and-interference ratios (SNRs). The SNR of a spatial channel determines its transmission capacity, which is typically quantified by a particular data rate that may be reliably transmitted on the spatial channel. For a time variant MIMO channel, the channel condition changes over time and the SNR of each spatial channel also changes over time.

A broadcast transmission is a data transmission that is intended to be received by any number of user terminals in the system, instead of a specific user terminal. A broadcast transmission is typically encoded and transmitted in a manner to achieve a specified quality of service (QoS). This quality of service may be quantified, for example, by error free reception of the broadcast transmission by a particular percentage (e.g., 99.9%) of the user terminals within a given broadcast coverage area at any given moment. Equivalently, the quality of service may be quantified by an "outage" probability, which is the percentage (e.g., 0.1%) of the user terminals within the broadcast coverage area that cannot correctly decode the broadcast transmission.

The broadcast transmission observes an ensemble of MIMO channels for an ensemble of user terminals in the broadcast coverage area. The MIMO channel for each user terminal may be random with respect to the MIMO channels for other user terminals. Furthermore, the MIMO channels for the user terminals may vary over time. To ensure that the broadcast transmission can meet the specified quality of service, the data rate for the broadcast transmission is typically selected to be sufficiently low so that the broadcast transmission can be reliably decoded even by the user terminal with the worst channel condition (i.e., the worst-case user terminal). The broadcast performance for such a system would then be dictated by the expected worst-case channel condition for all of the user terminals in the system. A similar phenomenon occurs for a MISO system.

There is therefore a need in the art for techniques to more efficiently broadcast data in a multi-antenna communication system.

DETAILED DESCRIPTION

Figure 1:
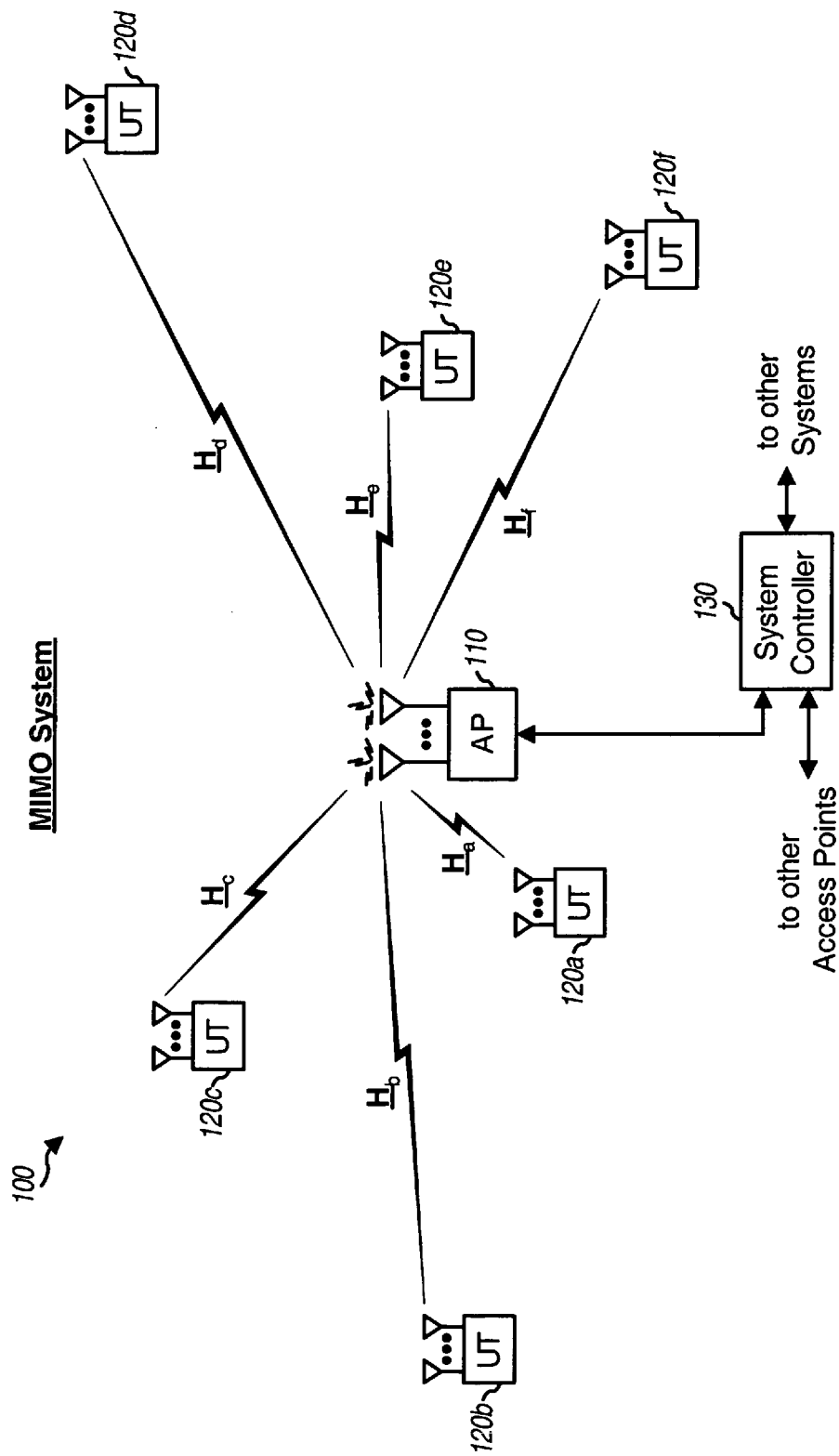
FIG. 1 shows a MIMO system with an access point and multi-antenna user terminals.

The word "exemplary" is used herein to mean "serving as an example, instance, or illustration." Any embodiment described herein as "exemplary" is not necessarily to be constructed as preferred or advantageous over other embodiments.

Techniques for broadcasting data using spatial spreading in a multi-antenna communication system are described herein. Spatial spreading refers to the transmission of a data symbol (which is a modulation symbol for data) from multiple transmit antennas simultaneously, possibly with different amplitudes and/or phases determined by a steering vector used for that data symbol. Spatial spreading may also be called transmit steering, pseudo-random transmit steering, steering diversity, matrix pseudo-random steering, vector pseudo-random steering, and so on. As used herein, "broadcast" refers to data transmission to either (1) an unspecified group of user terminals, e.g., all user terminals within a broadcast coverage area (which is commonly referred to as broadcast) or (2) a specific group of user terminals (which is commonly referred to as multi-cast). These broadcast transmission techniques can randomize an "effective" channel observed by each user terminal for each block of data symbols broadcast by an access point, so that system performance is not dictated by the expected worst-case channel condition.

In an embodiment for broadcasting data with spatial spreading, data for $N_D$ data streams is processed (e.g., encoded, interleaved, and modulated) to obtain $N_D$ data symbol blocks to be broadcast in $N_M$ transmission spans, where $N_D \geq 1$ and $N_M > 1$. A "transmission span" can cover time and/or frequency dimensions, as described below. Each data symbol block is generated from a block of coded data, which may be referred to as a "code block" or coded data packet. Each code block is encoded separately at the access point and decoded separately at a user terminal. The $N_D$ data symbol blocks are partitioned into $N_M$ data symbol subblocks, one subblock for each transmission span. A steering matrix is selected (e.g., in a deterministic or pseudo-random manner from among a set of L steering matrices) for each of the $N_M$ data symbol subblocks. Each data symbol subblock is spatially processed with the steering matrix selected for that subblock to obtain transmit symbols. The transmit symbols for each subblock are further processed and broadcast via $N_T$ transmit antennas in one transmission span to user terminals within the broadcast coverage area.

For a MIMO broadcast, each steering matrix contains $N_T$ rows and $N_S$ columns, where $N_S > 1$. The $N_D$ data symbol blocks are then broadcast via $N_S$ spatial channels of an effective MIMO channel. For example, if $N_D = N_S$, then the $N_D$ data symbol blocks may be multiplexed such that one data symbol block is broadcast on each of the $N_S$ spatial channels. For a MISO broadcast, each steering matrix contains $N_T$ rows and a single column and may be considered as a degenerative matrix or vector. The $N_D$ data symbol blocks are then broadcast via a single spatial channel of an effective MISO channel. For both MIMO and MISO broadcasts, the $N_D$ data symbol blocks are spatially processed with $N_M$ steering matrices and observe an ensemble of effective channels at each user terminal.

Various aspects and embodiments of the invention are described in further detail below.

The broadcast transmission techniques described herein may be used for a multi-antenna communication system, which may be a MIMO system or a MISO system. As used herein, "MIMO broadcast" refers to broadcast transmission on multiple spatial channels, and "MISO broadcast" refers to a broadcast transmission on a single spatial channel. The number of spatial channels available for transmission is determined by the number of transmit antennas, the number of receive antennas, and the wireless link or channel. The broadcast transmission techniques may also be used for single-carrier and multi-carrier systems. Multiple carriers may be provided by orthogonal frequency division multiplexing (OFDM) or some other constructs. OFDM effectively partitions the overall system bandwidth into multiple ($N^F$) orthogonal frequency subbands, which are also referred to as tones, subcarriers, bins, and frequency channels. With OFDM, each subband is associated with a respective subcarrier that may be modulated with data.

The broadcast transmission techniques described herein may be used for various types of broadcast data. For example, these techniques may be used for broadcast services that continually broadcast data (e.g., video, audio, news, and so on) to user terminals. These techniques may also be used for overhead channels (e.g., broadcast, paging, and control channels) in a wireless communication system.

1. MIMO Broadcast

FIG. 1 shows a MIMO system 100 with an access point (AP) 110 and user terminals (UTs) 120. An access point is generally a fixed station that communicates with the user terminals and may also be referred to as a base station or some other terminology. A user terminal may be fixed or mobile and may also be referred to as a mobile station, a wireless device, or some other terminology. Access point 110 is equipped with multiple ($N_{ap}$) antennas for data transmission. Each user terminal 120 is equipped with multiple ($N_{ut}$) antennas for data reception. In general, the user terminals in the system may be equipped with the same or different numbers of antennas. For simplicity, the following description assumes that the user terminals in the MIMO system are equipped with the same number of antennas. For a centralized architecture, system controller 130 provides coordination and control for the access points.

For a single-carrier MIMO system, a MIMO channel formed by the $N_{ap}$ antennas at the access point and the $N_{ut}$ antennas at a given user terminal u may be characterized by an $N_{ut} \times N_{ap}$ channel response matrix $H_u$, which may be expressed as:

$$H_u = \begin{bmatrix} h_{1,1} & h_{1,2} & \cdots & h_{1,N_{ap}} \\ h_{2,1} & h_{2,2} & \cdots & h_{2,N_{ap}} \\ \vdots & \vdots & \ddots & \vdots \\ h_{N_{ut},1} & h_{N_{ut},2} & \cdots & h_{N_{ut},N_{ap}} \end{bmatrix}, \quad \text{Eq (1)}$$

where entry $h_{i,j}$, for $i=1 \ldots N_{ut}$ and $j=1 \ldots N_{ap}$, denotes the coupling or complex gain between access point antenna j and user terminal antenna i. As shown in FIG. 1, the user terminals may be distributed throughout the coverage area of the access point. A different MIMO channel is formed by the $N_{ap}$ antennas at the access point and the $N_{ut}$ antennas at each user terminal.

Data may be transmitted in various manners in the single-carrier MIMO system. In one simple transmission scheme, one data symbol stream is transmitted from each access point antenna, and $N_S$ data symbol streams are transmitted simultaneously from $N_S$ of the $N_{ap}$ access point antennas, where $N_S$ is the number of spatial channels and $N_S \leq \min\{N_{ap}, N_{ut}\}$. The received symbols at user terminal U for this transmission scheme may be expressed as:

$$r_u = H_u s + n_u, \quad \text{Eq (2)}$$

where s is an $N_{ap} \times 1$ vector with $N_S$ non-zero entries for $N_S$ data symbols to be transmitted simultaneously by the access point;

$r_u$ is an $N_{ut} \times 1$ vector with entries for $N_{ut}$ received symbols obtained via the $N_{ut}$ antennas at user terminal u; and $n_u$ is a noise vector observed at user terminal u.

For simplicity, the noise is assumed to be additive white Gaussian noise (AWGN) with a zero mean vector and a covariance matrix of $\Lambda_u = \sigma_u^2 I$, where $\sigma_u^2$ is the variance of the noise observed by user terminal u and I is the identity matrix.

The $N_S$ data symbol streams transmitted from the $N_{ap}$ access point antennas interfere with each other at user terminal u. A given data symbol stream transmitted from one access point antenna may be received by all $N_{ut}$ user terminal antennas at different amplitudes and phases. Each received symbol stream includes a component of each of the $N_S$ transmitted data symbol streams. The $N_{ut}$ received symbol streams would collectively include all of the $N_S$ data symbol streams. However, these $N_S$ data symbol streams are dispersed among the $N_{ut}$ received symbol streams. User terminal u performs receiver spatial processing on the $N_{ut}$ received symbol streams to recover the $N_S$ data symbol streams transmitted by the access point.

The performance that can be achieved for user terminal u is dependent (to a large extent) on its channel response matrix $H_u$. If a high degree of correlation exists within $H_u$, then each data symbol stream would observe a large amount of interference from the other streams, which cannot be removed by the receiver spatial processing at the user terminal. The high level of interference degrades the SNR of each affected data symbol stream, possibly to a point where the data symbol stream cannot be decoded correctly by the user terminal.

For a data transmission to a specific user terminal via a given MIMO channel, system capacity may be achieved if the access point is provided with sufficient channel state information regarding the MIMO channel. The access point may then use this information to process data in a manner to maximize the throughput for the user terminal (e.g., select the proper rate for each data stream). Since different user terminals observe different MIMO channels, the access point would typically need to process data differently for each user terminal to maximize the throughput for that user terminal.

For a broadcast transmission, the access point transmits the same data to a number of user terminals within a broadcast coverage area. For broadcast, the access point typically does not have channel state information for the user terminals. Moreover, it is typically not practical to process data intended for multiple user terminals based on channel state information for a specific user terminal.

The broadcast transmission from the access point observes an ensemble of MIMO channels for different user terminals in the broadcast coverage area. A certain percentage of the MIMO channels may be considered as "bad". For example, a bad channel can occur when the channel response matrix H exhibits a high degree of correlation, or when there is insufficient scattering, multipath (large coherence bandwidth), or temporal fading (large coherence time) in the channel. The occurrence of "bad" channels is random, and it is desirable to minimize the percentage of time this can occur for each user terminal.

For broadcast, the access point needs to transmit each data symbol stream at a sufficiently low rate so that the stream can be recovered by the user terminals even under the worst-case channel condition. Broadcast performance is then dictated by the expected worst-case channel condition for all of the user terminals in the coverage area.

A. MIMO Broadcast Transmission

Spatial spreading may be used to randomize an effective MIMO channel observed by each user terminal so that broadcast performance is not dictated by a single channel realization over a code block. With spatial spreading, the access point performs spatial processing on each code block with multiple steering matrices to effectively randomize the MIMO channel for each user terminal. Consequently, each user terminal observes an ensemble of channels across each code block and is not stuck on a single channel for an extended portion of the code block.

The spatial processing at the access point for spatial spreading in the MIMO system may be expressed as:

$$x_{mimo}(m) = V(m) \cdot s(m), \quad \text{Eq (3)}$$

where s(m) is an $N_S \times 1$ vector with $N_S$ data symbols to be sent in transmission span m;

V(m) is an $N_{ap} \times N_S$ steering matrix for transmission span m; and $x_{mimo}(m)$ is an $N_{ap} \times 1$ vector with $N_{ap}$ transmit symbols to be sent from the $N_{ap}$ access point antennas in transmission span m.

A transmission span may cover time and/or frequency dimensions. For example, in a single-carrier MIMO system, a transmission span may correspond to one symbol period, which is the time duration to transmit one data symbol. As another example, in a multi-carrier MIMO system, such as a MIMO system that utilizes OFDM, a transmission span may correspond to one subband in one OFDM symbol period. A transmission span may also cover multiple symbol periods and/or multiple subbands. Thus, m may be an index for time and/or frequency. A transmission span may also be referred to as a transmission interval, a signaling interval, a slot, and so on.

A set of L steering matrices may be generated as described below and used for spatial spreading. This steering matrix set is denoted as $\{V\}$, or V(i) for i=1 ... L, where L may be any integer greater than one. One steering matrix in the set may be selected for each transmission span m and used for spatial processing by the access point for that transmission span. The results of the spatial processing are $N_{ap}$ transmit symbol streams for broadcast from the $N_{ap}$ access point antennas.

The received symbols at each user terminal with spatial spreading may be expressed as:

$$r(m) = H(m) \cdot V(m) \cdot s(m) + n(m) = H_{eff}(m) \cdot s(m) + n(m), \quad \text{Eq(4)}$$

where r(m) is an $N_{ut} \times 1$ vector with $N_{ut}$ received symbols for transmission span m;

H(m) is an $N_{ut} \times N_{ap}$ channel response matrix for transmission span m;

$H_{eff}(m)$ is an $N_{ut} \times N_S$ effective channel response matrix for transmission span m, which is $H_{eff}(m) = H(m) \cdot V(m)$; and n(m) is a noise vector for transmission span m.

For simplicity, the channel response H(m) is assumed to be constant over each transmission span. The quantities H(m), $H_{eff}(m)$, r(m) and n(m) are different for different user terminals, whereas the quantities V(m) and s(m) are the same for all user terminals. To simplify notation, the subscript "u" for user terminal u is omitted from the user-specific quantities in equation (4) and in the following description.

As shown in equation (4), because of the spatial spreading performed by the access point, the $N_S$ data symbol streams observe the effective channel response $H_{eff}(m)$ instead of the actual channel response H(m) for each user terminal. If multiple steering matrices are used for broadcast transmission, then each data symbol stream effectively observes an ensemble of spatial channels of H(m). Furthermore, if multiple steering matrices are used across a code block, then the data symbols in the code block would observe different channels across the code block.

In general, the access point may broadcast any number of ($N_D$) data streams simultaneously to the user terminals, where $N_S \geq N_D \geq 1$. For example, if $N_D = N_S$, then the access point may broadcast one data stream on each spatial channel of $H_{eff}(m)$. The maximum number of data streams that may be broadcast simultaneously is determined by the number of spatial channels for all user terminals, which in turn is determined by (1) the number of antennas at the access point and (2) the minimum number of antennas at all of the user terminals. If all user terminals are equipped with the same number of antennas, then min $\{N_{ap}, N_{ut}\} \geq N_S \geq N_D$. If $N_D = 1$, then the access point may broadcast one data stream from its $N_{ap}$ antennas.

Figure 2:
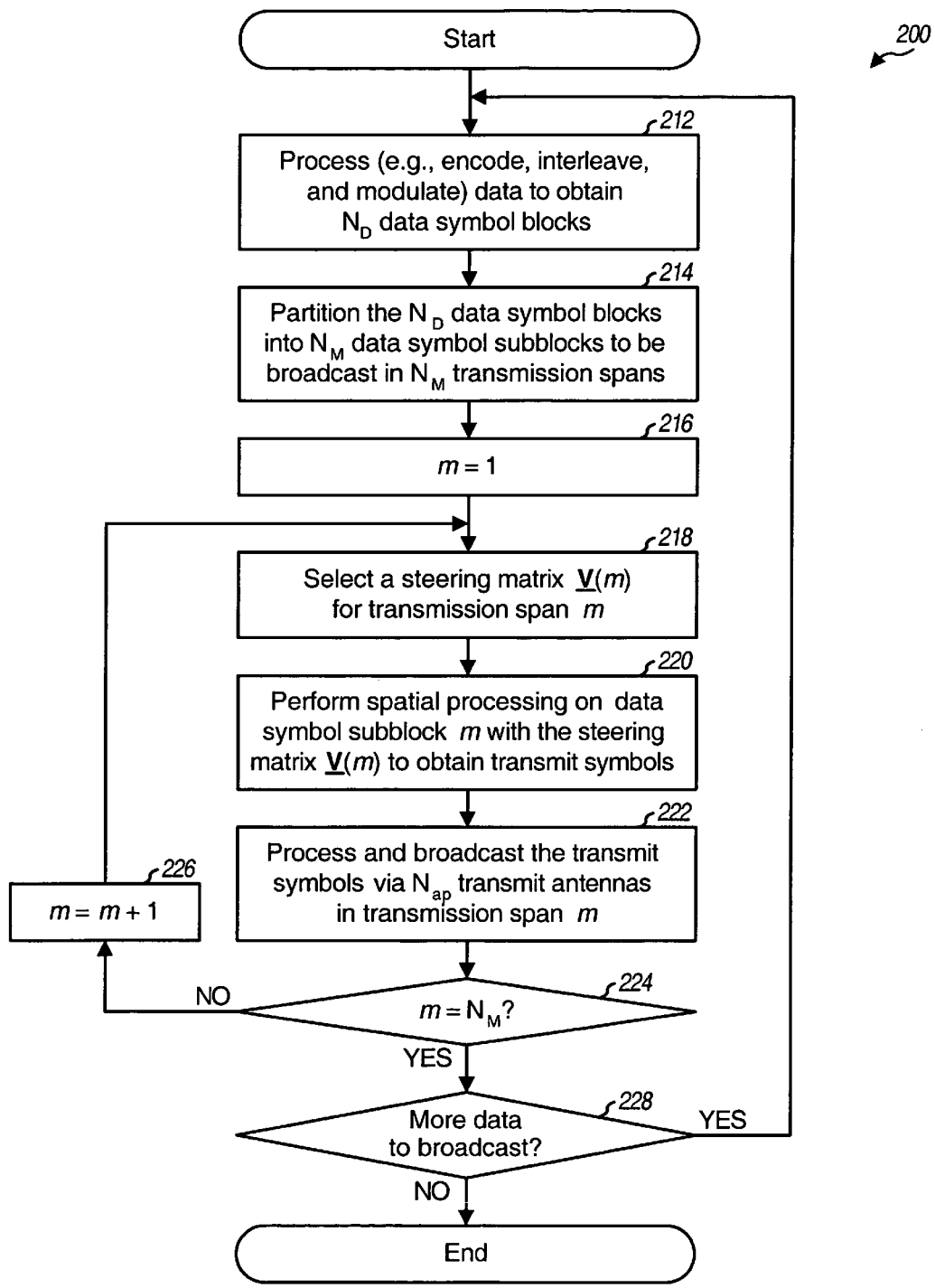
FIG. 2 shows a process for broadcasting data with spatial spreading.

FIG. 2 shows a process 200 for broadcasting data with spatial spreading. Initially, the access point processes data for $N_D$ data streams to obtain a set of $N_D$ data symbol blocks, one block for each data stream (block 212). Each data symbol block contains data symbols generated from one block of coded data, which may be called a code block or a coded data packet. The data processing may be performed as described below. The access point then partitions the $N_D$ data symbol blocks into $N_M$ data symbol subblocks to be broadcast in $N_M$ transmission spans, one subblock in each transmission span (block 214) $N_M$ is also referred to as the block length and is greater than one, or $N_M > 1$. Each subblock may contain one or more data symbols from each of the $N_D$ blocks. For example, if $N_D = N_S$, then each subblock may contain $N_S$ data symbols from $N_S$ blocks for $N_S$ data streams. As another example, if $N_D = 1$, then each subblock may contain $N_S$ data symbols from one block for one data stream. The index m used to denote the transmission span for the current set of data symbol blocks is set to 1 (block 216).

For each transmission span m, the access point selects one steering matrix, which is denoted as V(m), e.g., from the set of L steering matrices (block 218). The access point then performs spatial processing on data symbol subblock m with the steering matrix V(m) to obtain transmit symbols (block 220). If transmission span m covers one data symbol vector, then the access point forms one vector s(m) with up to $N_S$ data symbols from data symbol subblock m and spatially processes the vector s(m) with the matrix V(m) to obtain the transmit symbol vector $x_{mimo}(m)$, as shown in equation (3). If transmission span m covers multiple ($N_V$) data symbol vectors, then the access point forms $N_V$ vectors $s_l(m)$, for l = 1 ... $N_V$, from data symbol subblock m and spatially processes each vector $s_l(m)$ with the same steering matrix V(m) to obtain a corresponding transmit symbol vector $x_{mimo,l}(m)$. In any case, the access point uses the same steering matrix V(m) for spatial processing for all data symbol vectors in transmission span m. The access point further processes and broadcasts the resultant transmit symbol vectors via the $N_{ap}$ transmit antennas in transmission span m (block 222).

A determination is then made whether all $N_M$ data symbol subblocks have been processed and transmitted (i.e., whether m=$N_M$) (block 224). If the answer is 'No', then the index m is incremented for the next subblock/transmission span (block 226), and the process returns to block 218. If the answer is 'Yes' for block 224, then a determination is made whether there is more data to broadcast (block 228). If the answer is 'Yes', then the process returns to block 212 to start the processing for the next set of data symbol blocks. Otherwise, the process terminates.

Each set of data symbols blocks is thus spatially processed with $N_M$ steering matrices to obtain $N_{ap}$ transmit symbol sequences. Each transmit symbol sequence is broadcast from one antenna in $N_M$ transmission spans. The $N_M$ steering matrices randomize the effective MIMO channel observed by each user terminal for the $N_D$ data symbol blocks. The randomization of the MIMO channel results from using different steering matrices and not necessarily from randomness in the elements of the steering matrices.

As noted above, a transmission span may be defined to cover one or more symbol periods and/or one or more subbands. For improved performance, it is desirable to select the transmission span to be as small as possible so that (1) more steering matrices can be used for each data symbol block and (2) each user terminal can obtain as many "looks" of the MIMO channel as possible for each data symbol block. The transmission span should also be shorter than the coherence time of the MIMO channel, which is the time duration over which the MIMO channel can be assumed to be approximately static. Similarly, the transmission span should be smaller than the coherence bandwidth of the MIMO channel for a wideband system (e.g., an OFDM system).

B. MIMO Broadcast Reception

Figure 3:
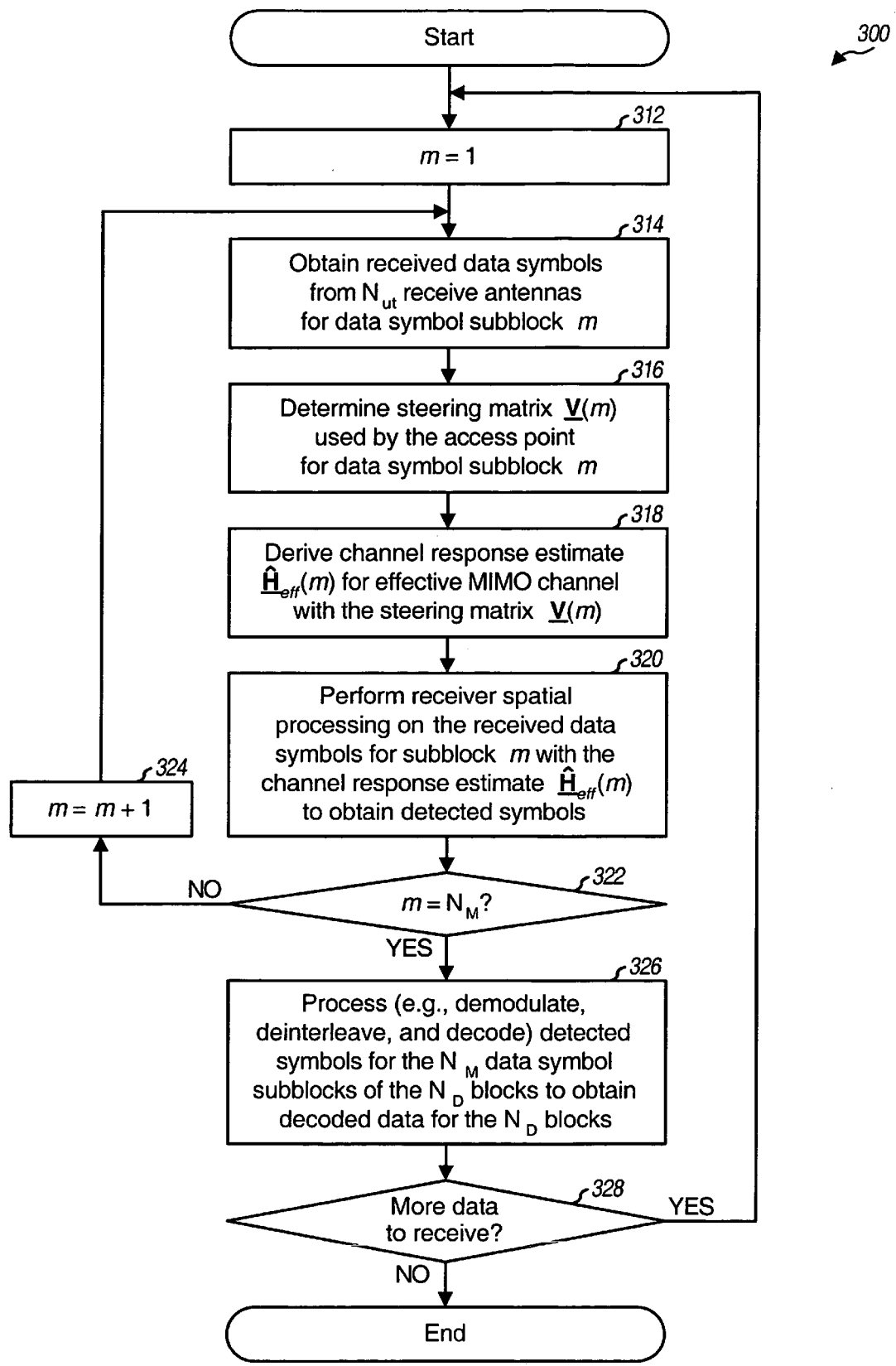
FIG. 3 shows a process for receiving a broadcast transmission.

FIG. 3 shows a process 300 for receiving a broadcast transmission with spatial spreading by a given user terminal. Initially, the index m used to denote the transmission span for the current set of data symbol blocks is set to 1 (block 312). The user terminal obtains received data symbols from the $N_{ut}$ receive antennas for data symbol subblock m (block 314). The user terminal determines the steering matrix V(m) used by the access point for subblock m (block 316) and uses V(m) to derive $\hat{H}_{eff}(m)$, which is an estimate of the channel response of the effective MIMO channel observed by the user terminal for subblock m (block 318). In the following description, "^" over a matrix, a vector, or a scalar denotes an estimate of the actual matrix, vector, or scalar. The user terminal then performs receiver spatial processing on the received data symbols with the effective channel response estimate $\hat{H}_{eff}(m)$ and obtains detected symbols (or data symbol estimates) for subblock m (block 320).

A determination is then made whether all $N_M$ data symbol subblocks for the current data symbol block set have been received (i.e., whether m=$N_M$) (block 322). If the answer is 'No', then the index m is incremented for the next subblock/transmission span (block 324), and the process returns to block 314. If the answer is 'Yes' for block 322, then the user terminal processes (e.g., demodulates, deinterleaves, and decodes) the detected symbols for all $N_M$ subblocks to obtain decoded data for the current data symbol block set (block 326). A determination is then made whether there is more data to receive (block 328). If the answer is 'Yes', then the process returns to block 312 to start receiving the next set of data symbol blocks. Otherwise, the process terminates.

Each user terminal can derive estimates of the transmitted data symbols using various receiver processing techniques. These techniques include a channel correlation matrix inversion (CCMI) technique (which is also commonly referred to as a zero-forcing technique), a minimum mean square error (MMSE) technique, a successive interference cancellation (SIC) technique, and so on. In the following description, one data symbol stream is broadcast on each spatial channel of $H_{eff}(m)$.

For the CCMI technique, the user terminal derives a spatial filter matrix $M_{ccmi}(m)$ for each transmission span m based on the effective channel response estimate $\hat{H}_{\mathit{eff}}(m)$, as follows:

$$M_{ccmi}(m) = [\hat{H}_{\mathit{eff}}^H(m) \cdot \hat{H}_{\mathit{eff}}(m)]^{-1} \cdot \hat{H}_{\mathit{eff}}^H(m), \qquad \text{Eq}(5)$$

where "$^H$" denotes the conjugate transpose. The user terminal can estimate the channel response matrix, e.g., based on received pilot symbols. A pilot symbol is a modulation symbol for pilot, which is data that is known a priori by both the access point and the user terminals. The user terminal may then compute the estimated effective channel response matrix as $\hat{H}_{\mathit{eff}}(m) = \hat{H}(m) \cdot V(m)$. Alternatively, the user terminal can directly estimate the effective channel response matrix, e.g., based on received pilot symbols that have been transmitted using $V(m)$.

The user terminal performs CCMI spatial processing as follows:

$$\begin{aligned}\hat{\underline{s}}_{ccmi}(m) &= \underline{M}_{ccmi}(m) \cdot \underline{r}(m), \qquad \text{Eq}(6)\\ &= \underline{R}^{-1}(m) \cdot \hat{\underline{H}}_{\mathit{eff}}^H(m) \cdot [\underline{H}_{\mathit{eff}}(m) \cdot \underline{s}(m) + \underline{n}(m)],\\ &= \underline{s}(k) + \underline{n}_{ccmi}(m),\end{aligned}$$

where $\hat{s}_{ccmi}(m)$ is an $N_S \times 1$ vector with detected symbols for transmission span m; and
$n_{ccmi}(m) = M_{ccmi}(m) \cdot n(m)$ is the CCMI filtered noise for transmission span m.

The SNR for the CCMI technique may be expressed as:

$$\gamma_{ccmi,\ell}(m) = \frac{P_\ell(m)}{r_{\ell\ell}(m)\,\sigma_n^2}, \qquad \text{for } \ell = 1 \ldots N_S, \qquad \text{Eq}(7)$$

where $P_\ell(m)$ is the transmit power for data symbol stream $\{s_\ell\}$ in transmission span m;
$r_{\ell\ell}(m)$ is the l-th diagonal element of $R^{-1}(m)$;
$\sigma_n^2$ is the variance of the noise at the user terminal; and
$\gamma_{ccmi,\ell}(m)$ is the SNR of data symbol stream $\{s_\ell\}$ in transmission span m.

The quantity $P_\ell(m)/\sigma_n^2$ is the SNR of data symbol stream $\{s_\ell\}$ at the user terminal prior to the receiver spatial processing and is commonly referred to as the received SNR, the operating SNR, or the link margin. The quantity $\gamma_{ccmi,\ell}(m)$ is the SNR of data symbol stream $\{s_\ell\}$ after the receiver spatial processing and is also referred to as the post-detection SNR. In the following description, "SNR" refers to post-detection SNR unless noted otherwise. Due to the structure of $R(m)$, the CCMI technique may amplify the noise.

For the MMSE technique, the user terminal derives a spatial filter matrix $M_{mmse}(m)$ for each transmission span m based on the effective channel response estimate $\hat{H}_{\mathit{eff}}(m)$, as follows:

$$\begin{aligned}\underline{M}_{mmse}(m) &= \left[\hat{\underline{H}}_{\mathit{eff}}^H(m) \cdot \hat{\underline{H}}_{\mathit{eff}}(m) + \underline{\varphi}_{nn}(m)\right]^{-1} \cdot \hat{\underline{H}}_{\mathit{eff}}^H(m), \qquad \text{Eq}(8)\\ &= \left[\hat{\underline{H}}_{\mathit{eff}}^H(m) \cdot \hat{\underline{H}}_{\mathit{eff}}(m) + \sigma_n^2 \underline{I}\right]^{-1} \cdot \hat{\underline{H}}_{\mathit{eff}}^H(m),\end{aligned}$$

where $\varphi_{nn}(m)$ is an autocovariance matrix of the noise vector $n(m)$, which is $\varphi_{nn}(m) = E[n(m) \cdot n^H(m)]$, where $E[x]$ is the expected value of x. The second equality in equation (8) assumes that the noise vector $n(m)$ is AWGN with zero mean and variance of $\sigma_n^2$. The spatial filter matrix $M_{mmse}(m)$ minimizes the mean square error between the symbol estimates from the spatial filter and the data symbols.

The user terminal performs MMSE spatial processing as follows:

$$\begin{aligned}\hat{\underline{s}}_{mmse}(m) &= \underline{D}_Q(m) \cdot \underline{M}_{mmse}(m) \cdot \underline{r}(m), \qquad \text{Eq}(9)\\ &= \underline{D}_Q(m) \cdot \underline{M}_{mmse}(m) \cdot [\underline{H}_{\mathit{eff}}(m) \cdot \underline{s}(m) + \underline{n}(m)],\\ &= \underline{D}_Q(m) \cdot \underline{Q}(m) \cdot \underline{s}(m) + \underline{n}_{mmse}(m),\end{aligned}$$

where $\hat{s}_{mmse}(m)$ is an $N_S \times 1$ vector with detected symbols for transmission span m;
$Q(m) = M_{mmse}(m) \cdot H_{\mathit{eff}}(m)$;
$D_Q(m)$ is a diagonal matrix whose diagonal elements are the diagonal elements of $Q^{-1}(m)$, or $D_Q(m) = [\text{diag}[Q(m)]]^{-1}$; and
$n_{mmse}(m) = D_Q(m) M_{mmse}(m) \cdot n(m)$ is the MMSE filtered noise.

The symbol estimates from the spatial filter are unnormalized estimates of the data symbols. The multiplication with the scaling matrix $D_Q(m)$ provides normalized estimates of the data symbols.

The SNR for the MMSE technique may be expressed as:

$$\gamma_{mmse,\ell}(m) = \frac{q_{\ell\ell}(m)}{1 - q_{\ell\ell}(m)} P_\ell(m), \qquad \text{for } \ell = 1 \ldots N_S, \qquad \text{Eq}(10)$$

where $q_{\ell\ell}(m)$ is the l-th diagonal element of $Q(m)$; and
$\gamma_{mmse,\ell}(m)$ is the SNR for data symbol stream $\{s_\ell\}$ in transmission span m.

For the SIC technique, the user terminal processes the $N_{ut}$ received symbol streams in $N_D$ successive stages for the $N_D$ data streams. For each stage, the user terminal performs spatial processing on either the $N_{ut}$ received symbol streams or $N_{ut}$ modified symbol streams from the preceding stage (e.g., using the CCMI, MMSE, or some other technique) to obtain one detected symbol stream. The user terminal then processes (e.g., demodulates, deinterleaves, and decodes) this detected symbol stream to obtain a corresponding decoded data stream. The user terminal next estimates and cancels the interference due to this stream and obtains $N_{ut}$ modified symbol streams for the next stage. The user terminal then repeats the same processing on the $N_{ut}$ modified symbol streams to recover another data stream. If the interference due to each data stream can be accurately estimated and canceled, then later recovered data streams experience less interference and in general are able to achieve higher SNRs on average. This permits the MIMO broadcast to employ higher data rates on those streams that are detected later, effectively improving the throughput of the broadcast. If different data rates are employed on different transmitted data streams, then the user terminals may decode these streams in a predetermined order from the lowest data rate stream to the highest data rate stream.

For the SIC technique, improved performance can be achieved by estimating the interference using decoded data instead of the detected symbols. In this case, the $N_D$ data symbol blocks for each block length are recovered one block at a time. Each data symbol block is detected and decoded in one stage, and the decoded data is used to estimate and cancel the interference due to the data symbol block.

For clarity, the following description assumes that (1) $N_D=N_S$ and each data symbol block/stream is transmitted as one entry of the data symbol vector s(m) and (2) the $N_D$ data symbol streams are recovered in sequential order so that data symbol stream $\{s_l\}$ is recovered in stage l, for l=1 ... $N_S$. For the SIC technique, the input (received or modified) symbol streams for stage l, where l=1 ... $N_S$, may be expressed as:

$$r_{sic}^l(m)=H_{eff}^l(m)\cdot s^l(m)+n^l(m), \quad \text{Eq (11)}$$

where $r_{sic}^l(m)$ is a vector of $N_{ut}$ modified symbols for transmission span m in stage l, and $r_{sic}^l(m)=r(m)$ for the first stage;

$s^l(m)$ is a vector of $N_S-l+1$ data symbols not yet recovered for transmission span m in stage l;

$H_{eff}^l(m)$ is an $N_{ut} \times (N_{ap}-l+1)$ reduced effective channel response matrix for transmission span m in stage l; and $n^l(m)$ is a reduced vector of n(m).

Equation (11) assumes that the data symbol streams recovered in the l-1 prior stages are canceled. The dimensionality of the matrix $H_{eff}(m)$ successively reduces by one column for each stage as a data symbol stream is recovered and canceled. For stage l, the reduced effective channel response matrix $H_{eff}^l(m)$ is obtained by removing l-1 columns in the original matrix $H_{eff}(m)$ corresponding to the l-1 data symbol streams previously recovered, or $H_{eff}^l(m)=[h_{eff,l}(m) \; h_{eff,l+1}(m) \ldots h_{eff,N_S}(m)]$, where $h_{eff,l}(m)$ is an $N_{ut} \times 1$ vector for the effective channel response observed by data symbol stream $\{s_l\}$ in transmission span m.

For stage l, the user terminal derives a spatial filter matrix $M_{sic}^l(m)$ based on the reduced effective channel response estimate $\hat{H}_{eff}^l(m)$ (instead of the original effective channel response estimate $\hat{H}_{eff}(m)$) using the CCMI technique as shown in equation (5), the MMSE technique as shown in equation (8), or some other technique. The spatial filter matrix $M_{sic}^l(m)$ has dimensionality of $(N_S-l+1) \times N_{ut}$. Since $\hat{H}_{eff}^l(m)$ is different for each stage, the matrix $M_{sic}^l(m)$ is also different for each stage.

The user terminal performs spatial processing for stage l, as follows:

$$\hat{s}_{sic}^l(m) = \underline{D}_{sic}^l(m) \cdot \underline{M}_{sic}^l(m) \cdot \underline{r}_{sic}^l(m), \quad \text{Eq (12)}$$
$$= \underline{D}_{sic}^l(m) \cdot \underline{M}_{sic}^l(m) \cdot [\underline{H}_{eff}^l(m) \cdot \underline{s}^l(m) + \underline{n}^l(m)],$$
$$= \underline{D}_{sic}^l(m) \cdot \underline{Q}_{sic}^l(m) \cdot \underline{s}^l(m) + \underline{n}_{sic}^l(m),$$

where $\hat{s}_{sic}^l(m)$ is a vector with $N_S-l+1$ detected symbols for transmission span m in stage l;

$Q_{sic}^l(m)=M_{sic}^l(m) \cdot H_{eff}^l(m)$;

$D_{sic}^l(m)$ is a matrix of diagonal elements of $[Q_{sic}^l(m)]^{-1}$; and $n_{sic}^l(m)$ is the filtered noise for transmission span m in stage l.

The user terminal selects one of the detected symbol streams for recovery.

Since only one data symbol stream is recovered in each stage, the user terminal can simply derive a $1 \times N_{ut}$ spatial filter row vector $m^l(m)$ for data symbol stream $\{s_l\}$ to be recovered in stage l. The row vector $m^l(m)$ is one row of the matrix $M_{sic}^l(m)$. In this case, the spatial processing for stage l may be expressed as:

$$\hat{s}_l(m)=\alpha_l \cdot m^l(m) \cdot r_{sic}^l(m)=\alpha_l \cdot q^l(m) \cdot s^l(m)+n^l(m), \quad \text{Eq(13)}$$

where $q^l(k)$ is the row of $Q_{sic}^l(m)$ corresponding to data symbol stream $\{s_l\}$ and $\alpha_l$ is a scaling factor for data symbol stream $\{s_l\}$.

In any case, the user terminal processes (e.g., demodulates, deinterleaves, and decodes) the detected symbol stream $\{\hat{s}_l\}$ to obtain a decoded data stream $\{\hat{d}_l\}$. The user terminal also forms an estimate of the interference this stream causes to the other data symbol streams not yet recovered. To estimate the interference, the user terminal re-encodes, interleaves, and symbol maps the decoded data stream $\{\hat{d}_l\}$ in the same manner as performed at the access point and obtains a stream of "remodulated" symbols $\{\check{s}_l\}$, which is an estimate of the data symbol stream $\{s_l\}$ just recovered. The user terminal then convolves the remodulated symbol stream $\{\check{s}_l\}$ with each of $N_{ut}$ elements in the effective channel response vector $h_{eff,l}(m)$ for stream $\{s_l\}$ to obtain $N_{ut}$ interference components $i^l(m)$ caused by this stream. The $N_{ut}$ interference components are then subtracted from the $N_{ut}$ modified symbol streams $r_{sic}^l(m)$ for stage l to obtain $N_{ut}$ modified symbol streams $$r_{sic,u}^{l+1}(m)$$

for the next stage, or $$\underline{r}_{sic}^{l+1}(m) = \underline{r}_{sic}^l(m) - \underline{i}^l(m).$$

The modified symbol streams $r_{sic}^{l+1}(m)$ represent the streams that would have been received if the data symbol stream $\{s_l\}$ had not been transmitted, assuming that the interference cancellation was effectively performed.

For the SIC technique, the SNR of each data symbol stream is dependent on (1) the spatial processing technique (e.g., CCMI or MMSE) used for each stage, (2) the specific stage in which the data symbol stream is recovered, and (3) the amount of interference due to the data symbol streams recovered in later stages. The SNR for the SIC technique with CCMI may be expressed as:

$$\gamma_{sic-ccmi,\ell}(m) = \frac{P_\ell(m)}{r_\ell(m) \sigma_n^2}, \quad \text{for } \ell = 1 \ldots N_S, \quad \text{Eq (14)}$$

where $r_l(m)$ is the diagonal element of $[R^l(m)]^{-1}$ for data symbol stream $\{s_l\}$, and $R^l(m)=[H_{eff}^l(m)]^H \cdot H_{eff}^l(m)$.

The SNR for the SIC technique with MMSE may be expressed as:

$$\gamma_{sic-mmse,l}(m) = \frac{q_l(m)}{1-q_l(m)} P_l(m), \quad \text{for } l = 1 \ldots N_S, \quad \text{Eq (15)}$$

where $q_l(m)$ is the diagonal element of $Q_{sic}^l(m)$ for data symbol stream $\{s_l\}$, where $Q_{sic}^l(m)$ is derived as shown for equation (9) but based on the reduced effective channel response matrix $\hat{H}_{\mathit{eff}}(m)$ instead of the original effective channel response matrix $\hat{H}_{\mathit{eff}}(m)$.

In general, the SNR progressively improves for data symbol streams recovered in later stages because the interference from data symbol streams recovered in prior stages is canceled. This then allows higher rates to be used for data symbol streams recovered later.

The above description for the SIC technique assumes that each data symbol block is sent as one entry of s(m). In general, each stage decodes and recovers one data symbol block, which may have been demultiplexed and sent in any number of entries of s(m). The above description also assumes that the data streams are recovered in a sequential order determined by the stream index l. Better performance may be achieved by recovering the data streams in a sequential order determined by their required SNRs. For example, the data stream requiring the lowest SNR (e.g., the data stream sent with the lowest data rate and/or highest transmit power) may be recovered first, followed by the data stream with the next lowest required SNR, and so on.

C. Steering Matrix Selection

As noted above, a set of L steering matrices may be generated and used for spatial spreading. The steering matrices in the set may be selected for use in various manners. In one embodiment, the steering matrices are selected from the set in a deterministic manner. For example, the L steering matrices may be cycled through and selected in sequential order, starting with the first steering matrix V(1), then the second steering matrix V(2), and so on, and then the last steering matrix V(L). In another embodiment, the steering matrices are selected from the set in a pseudo-random manner. For example, the steering matrix to use for each transmission span m may be selected based on a function $f(m)$ that pseudo-randomly selects one of the L steering matrices, or steering matrix V($f(m)$). In yet another embodiment, the steering matrices are selected from the set in a "permutated" manner. For example, the L steering matrices may be cycled through and selected for use in sequential order. However, the starting steering matrix for each cycle may be selected in a pseudo-random manner, instead of always being the first steering matrix V(1). The L steering matrices may also be selected in other manners, and this is within the scope of the invention.

The steering matrix selection may also be dependent on the number of steering matrices (L) in the set and the block length ($N_M$). In general, the number of steering matrices may be greater than, equal to, or less than the block length. Steering matrix selection for these three cases may be performed as described below.

If L=$N_M$, then the number of steering matrices matches the block length. In this case, a different steering matrix may be selected for each of the $N_M$ transmission spans used to broadcast a set of data symbol blocks. The $N_M$ steering matrices for the $N_M$ transmission spans may be selected in a deterministic, pseudo-random, or permutated manner, as described above.

If L<$N_M$, then the block length is longer than the number of steering matrices in the set. In this case, the steering matrices are reused for each data symbol block set and may be selected as described above.

If L>$N_M$, then a subset of the steering matrices is used for each data symbol block set. The selection of the specific subset to use for each data symbol block set may be deterministic or pseudo-random. For example, the first steering matrix to use for the current data symbol block set may be the steering matrix after the last one used for a prior data symbol block set.

D. MIMO System

Figure 4:
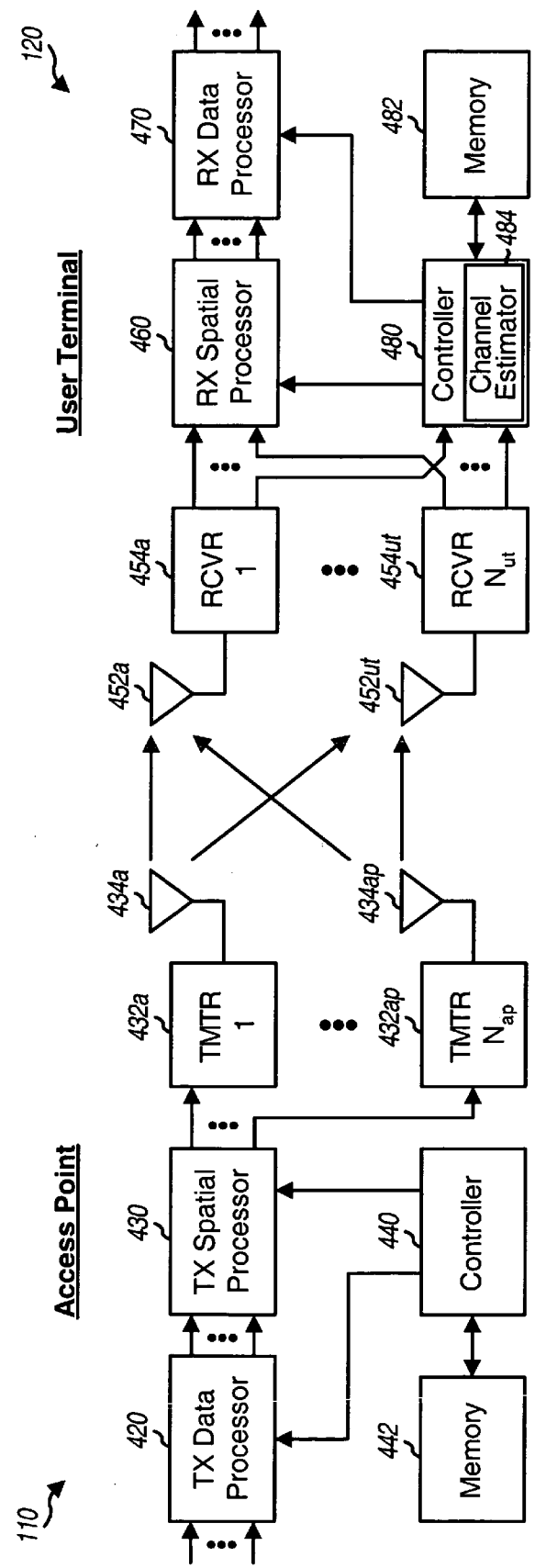
FIG. 4 shows a block diagram of the access point and multi-antenna user terminal.

FIG. 4 shows a block diagram of access point 110 and user terminal 120 in MIMO system 100. User terminal 120 is one of the user terminals in FIG. 1. At access point 110, a TX data processor 420 receives and processes (e.g., encodes, interleaves, and modulates) data for $N_D$ data streams and provides $N_S$ data symbol streams, where $N_S \geq N_D \geq 1$. A TX spatial processor 430 receives and spatially processes the $N_S$ data symbol streams for spatial spreading, multiplexes in pilot symbols, and provides $N_{ap}$ transmit symbol streams to $N_{ap}$ transmitter units (TMTR) 432a through 432ap. The processing by TX data processor 420 is described below, and the spatial processing by TX spatial processor 430 is as described above. Each transmitter unit 432 conditions (e.g., converts to analog, filters, amplifies, and frequency upconverts) a respective transmit symbol stream to generate a modulated signal. $N_{ap}$ transmitter units 432a through 432ap provide $N_{ap}$ modulated signals for transmission from $N_{ap}$ antennas 434a through 434ap, respectively.

At user terminal 120, $N_{ut}$ antennas 452a through 452ut receive the $N_{ap}$ transmitted signals, and each antenna 452 provides a received signal to a respective receiver unit (RCVR) 454. Each receiver unit 454 performs processing complementary to that performed by transmitter unit 432 and provides (1) received data symbols to an RX spatial processor 460 and (2) received pilot symbols to a channel estimator 484 within a controller 480. Receive spatial processor 460 performs spatial processing on $N_{ut}$ received symbol streams from $N_{ut}$ receiver units 454a through 454ut with spatial filter matrices from controller 480 and provides $N_S$ detected symbol streams, which are estimates of the $N_S$ data symbol streams broadcast by access point 110. An RX data processor 470 then processes (e.g., demaps, deinterleaves, and decodes) the $N_S$ detected symbol streams and provides $N_D$ decoded data streams, which are estimates of the $N_D$ data streams.

Controllers 440 and 480 control the operation of various processing units at access point 110 and user terminal 120, respectively. Memory units 442 and 482 store data and/or program codes used by controllers 440 and 480, respectively.

Figure 5A:
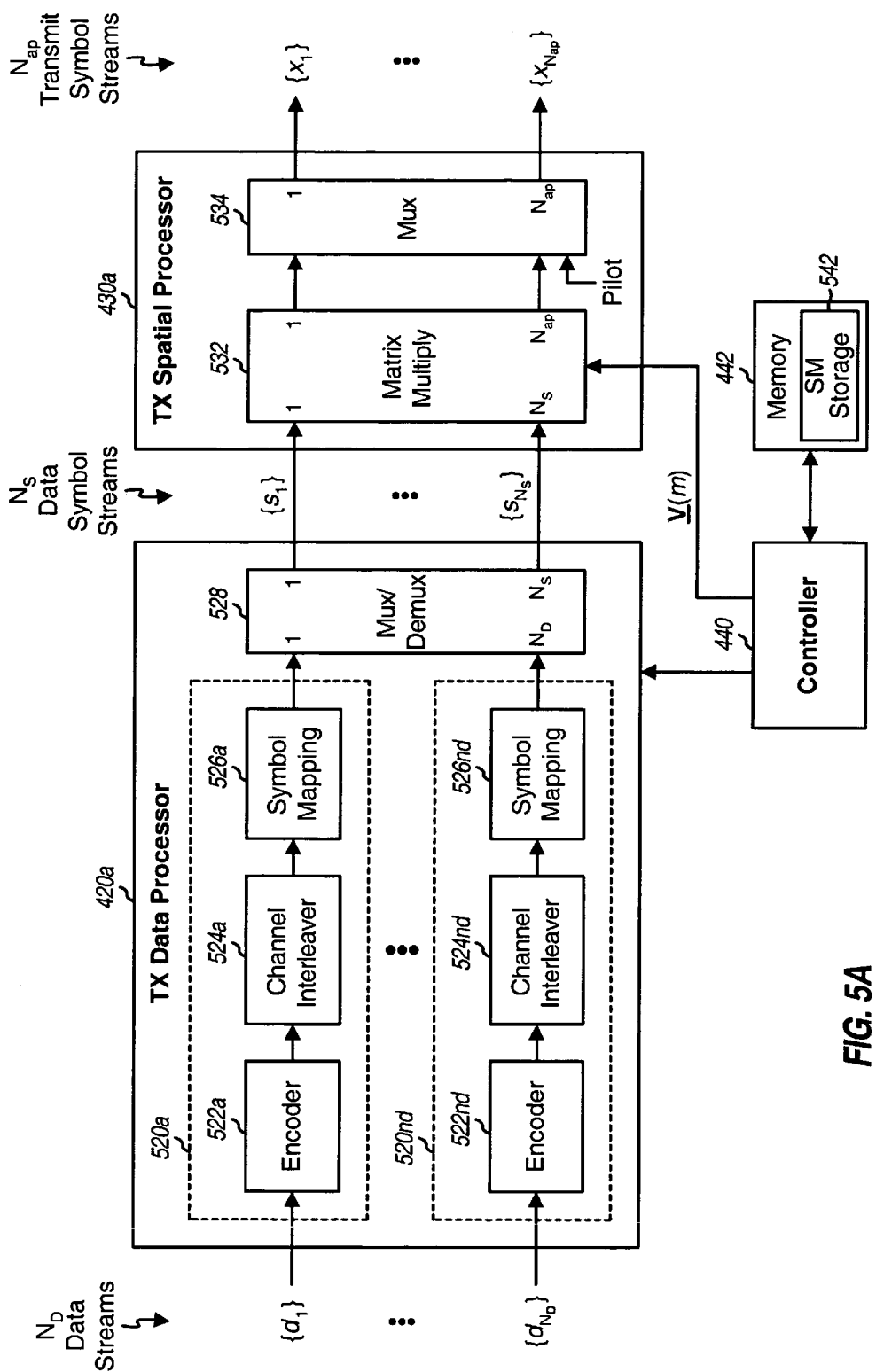
FIGS. 5A and 5B show two embodiments of a transmit (TX) data processor and a TX spatial processor at the access point.

FIG. 5A shows a block diagram of a TX data processor 420a and a TX spatial processor 430a, which are one embodiment of TX data processor 420 and TX spatial processor 430 at access point 110. For this embodiment, TX data processor 420a includes $N_D$ TX data stream processors 520a through 520nd for $N_D$ data streams, $\{d_l\}$ for l=1 . . . $N_D$.

Within each TX data stream processor 520, an encoder 522 receives and encodes data stream $\{d_l\}$ based on a coding scheme and provides code bits. The data stream may carry one or more data packets, and each data packet is typically encoded separately to obtain a code block or coded data packet. The coding increases the reliability of the data transmission. The coding scheme may include cyclic redundancy check (CRC) generation, convolutional coding, Turbo coding, low density parity check (LDPC) coding, block coding, other coding, or a combination thereof. With spatial spreading, the SNR can vary across a code block even if the MIMO channel is static over the code block. A sufficiently powerful coding scheme may be used to combat the SNR variation across the code block, so that coded performance is proportional to the average SNR across the code block. Some exemplary coding schemes that can provide good performance for spatial spreading include Turbo code (e.g., the one defined by IS-856), LDPC code, and convolutional code.

A channel interleaver 524 interleaves (i.e., reorders) the code bits based on an interleaving scheme to achieve frequency, time and/or spatial diversity. The interleaving may be performed across a code block, a partial code block, multiple code blocks, one or more transmission spans, and so on. A symbol mapping unit 526 maps the interleaved bits based on a modulation scheme and provides a stream of data symbols $\{s_l\}$. Unit 526 groups each set of B interleaved bits to form a B-bit value, where $B \geq 1$, and further maps each B-bit value to a specific modulation symbol based on the modulation scheme (e.g., QPSK, M-PSK, or M-QAM, where $M=2^B$). Unit 526 provides a block of data symbols for each code block.

In FIG. 5A, $N_D$ TX data stream processors 520a through 520nd process the $N_D$ data streams and provide $N_D$ data symbol blocks for each block length of $N_M$ transmission spans. One TX data stream processor 520 may also process the $N_D$ data streams, e.g., in a time division multiplex (TDM) manner. The same or different coding and modulation schemes may be used for the $N_D$ data streams. Furthermore, the same or different data rates may be used for the $N_D$ data streams. The data rate for each data stream is determined by the coding and modulation schemes used for that stream.

A multiplexer/demultiplexer (Mux/Demux) 528 receives and multiplexes/demultiplexes the data symbols for the $N_D$ data streams into $N_S$ data symbol streams. If $N_D=N_S$, then Mux/Demux 528 can simply provide the data symbols for each data stream as a respective data symbol stream. If $N_D=1$, then Mux/Demux 528 demultiplexes the data symbols for the one data stream into $N_S$ data symbol streams.

TX spatial processor 430a receives $N_D$ data symbol blocks from TX data processor 420a and $N_M$ steering matrices V(m) from controller 440 for each block length of $N_M$ transmission spans. The steering matrices may be retrieved from a steering matrix (SM) storage 542 within memory unit 442 or generated by controller 440 as they are needed. Within TX spatial processor 430a, a matrix multiply unit 532 performs spatial processing on the data symbols for each transmission span m with the steering matrix V(m) and provides transmit symbols for that transmission span. A multiplexer 534 multiplexes the transmit symbols with pilot symbols, e.g., in a time division multiplexed manner. For each transmission span, TX spatial processor 430a provides $N_{ap}$ transmit symbol sequences for broadcast from the $N_{ap}$ access point antennas in one or more symbol periods and/or on one or more subbands for that transmission span. TX spatial processor 430a further multiplexes the $N_{ap}$ transmit symbol sequences for different transmission spans and provides $N_{ap}$ transmit symbol streams, $\{x_j\}$ for $j=1 \ldots N_{ap}$, for the $N_{ap}$ access point antennas.

Figure 5B:
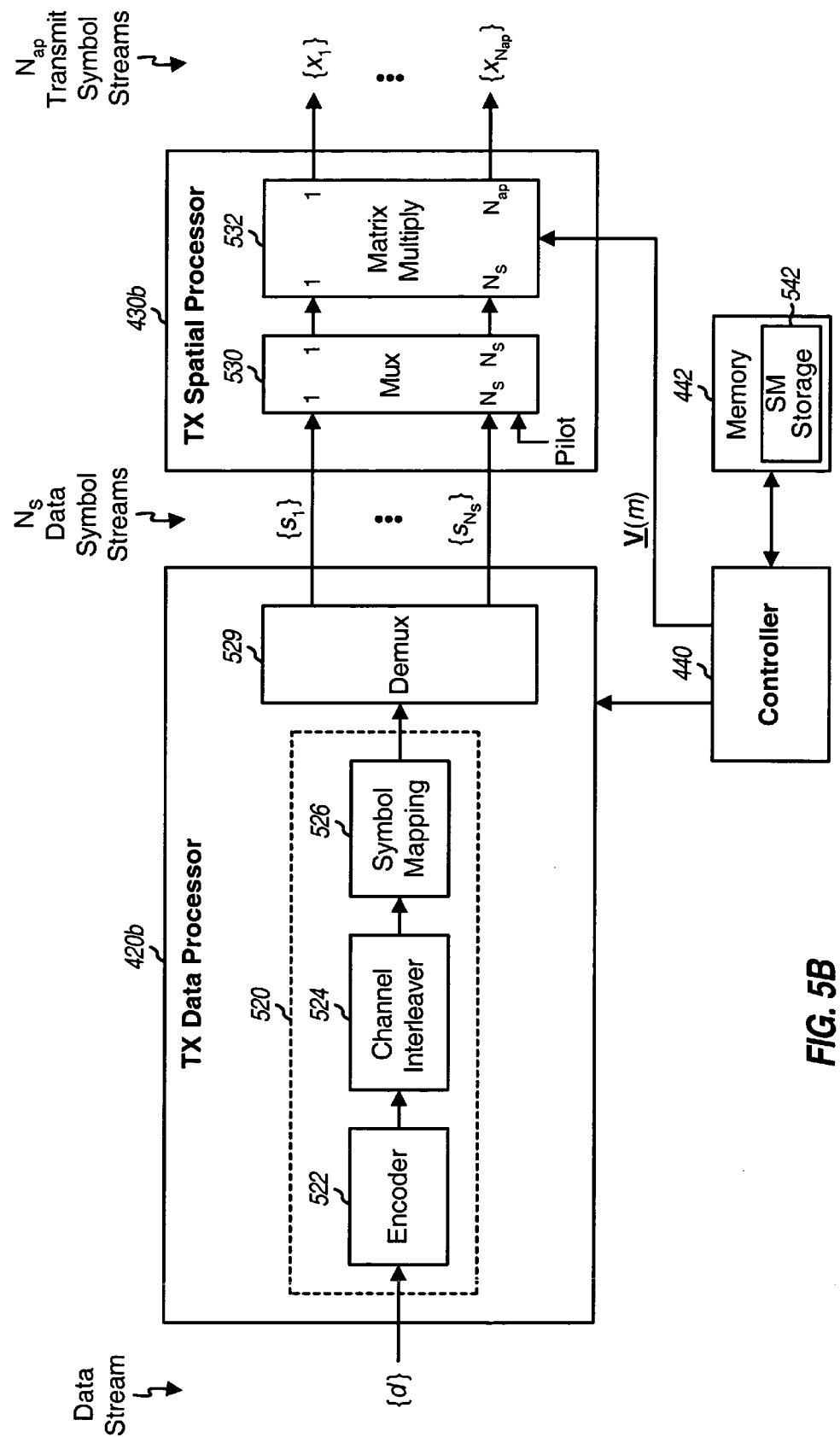

FIG. 5B shows a block diagram of a TX data processor 420b and a TX spatial processor 430b, which are another embodiment of TX data processor 420 and TX spatial processor 430 at access point 110. For this embodiment, TX data processor 420b includes one TX data stream processor 520 for one data stream $\{d\}$. TX data stream processor 520 processes data stream $\{d\}$ as described above for FIG. 5A and provides data symbols. A demultiplexer 529 demultiplexes the data symbols from processor 520 into $N_S$ data symbol streams, $\{s_l\}$ for $l=1 \ldots N_S$, so that each data symbol block is broadcast on $N_S$ spatial channels of H(m).

Within TX spatial processor 430b, a multiplexer 530 receives the $N_S$ data symbol streams from TX data processor 420b, multiplexes in pilot symbols, and provides $N_S$ streams of data/pilot symbols. Matrix multiply unit 532 performs spatial processing on the data/pilot symbols for each transmission span m with the steering matrix V(m) and provides transmit symbols for that transmission span. TX spatial processor 430b provides $N_{ap}$ transmit symbol streams, $\{x_j\}$ for $j=1 \ldots N_{ap}$, for the $N_{ap}$ access point antennas. TX spatial processor 430b performs spatial spreading on both pilot and data symbols, whereas TX spatial processor 430a performs spatial spreading on data symbols but not pilot symbols.

FIGS. 5A and 5B show exemplary embodiments of TX data processor 420 and TX spatial processor 430 at access point 110. Processors 420 and 430 may also be implemented in other manners, and this is within the scope of the invention.

Figure 6A:
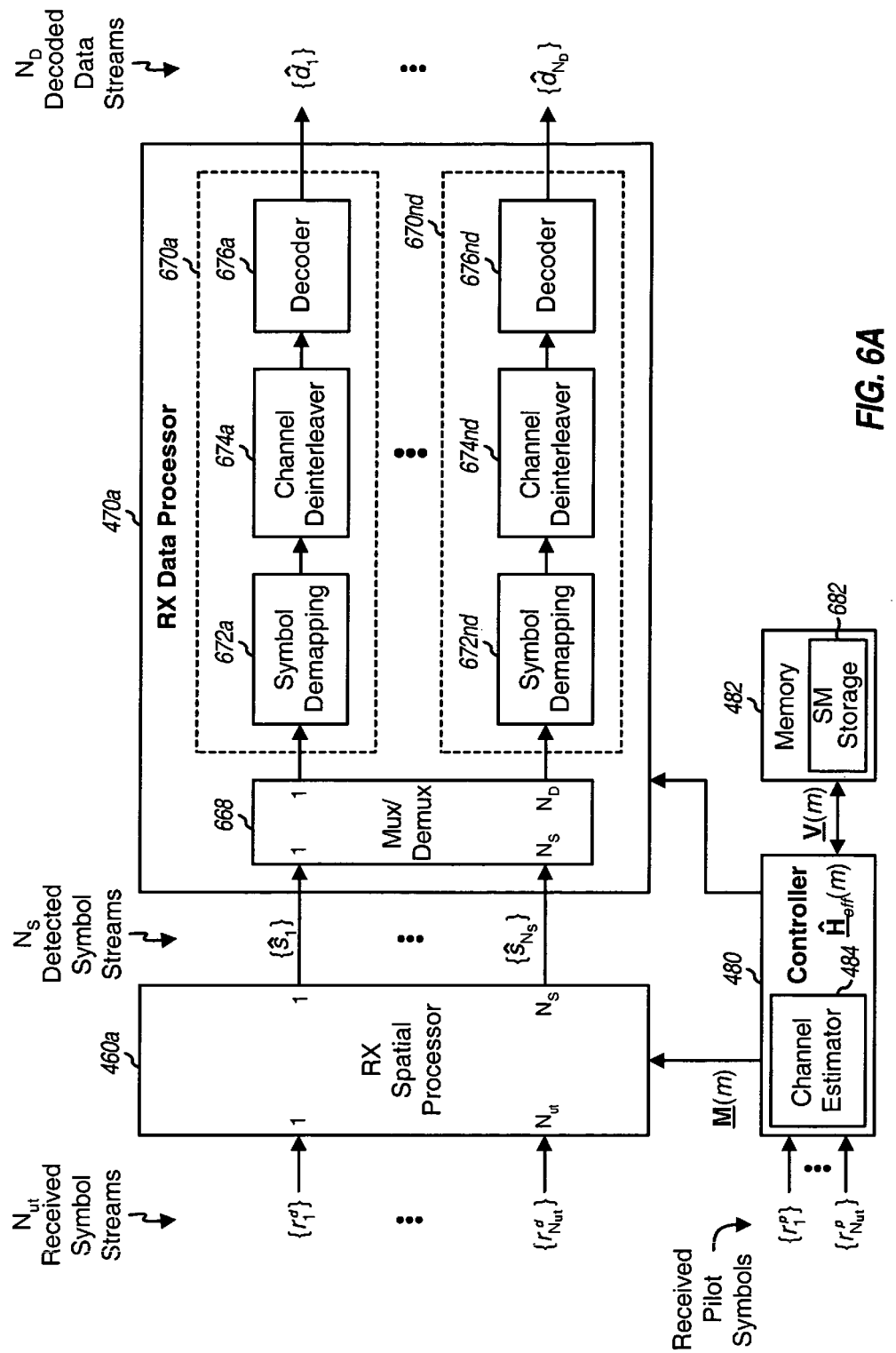
FIGS. 6A and 6B show two embodiments of a receive (RX) spatial processor and an RX data processor at the multi-antenna user terminal.

FIG. 6A shows a block diagram of an embodiment of the processing units at user terminal 120, which may be used in conjunction with the access point embodiment shown in FIG. 5A. $N_{ut}$ receiver units 454a through 454ut provide received pilot symbols, $\{r_i^p\}$ for $i=1 \ldots N_{ut}$, to channel estimator 484. If access point 110 transmits pilot symbols without spatial spreading (as shown in FIG. 5A), then channel estimator 484 derives $\hat{H}(m)$, which is an estimate of the channel response matrix H(m), based on the received pilot symbols. Channel estimator 484 then obtains the steering matrix V(m) for each transmission span m and derives $\hat{H}_{eff}(m)$, which is an estimate of the effective channel response matrix, as $\hat{H}_{eff}(m)=\hat{H}(m) \cdot V(m)$. User terminal 120 is synchronized to access point 110 so that both entities use the same steering matrix V(m) for each transmission span m. If access point 110 transmits pilot symbols with spatial spreading (as shown in FIG. 5B), then channel estimator 484 directly estimates the effective channel response matrix based on the received pilot symbols. In any case, channel estimator 484 provides the estimated effective channel response matrix $\hat{H}_{eff}(m)$ for each transmission span.

Controller 480 derives a spatial filter matrix M(m) and possibly a diagonal matrix D(m) for each transmission span based on the estimated effective channel response matrix $\hat{H}_{eff}(m)$ and using the CCMI, MMSE, or some other technique. RX spatial processor 460 obtains received data symbols, $\{r_i^d\}$ for $i=1 \ldots N_{ut}$, from receiver units 454a through 454ut and the matrices M(m) and D(m) from controller 480. RX spatial processor 460 performs receiver spatial processing on the received data symbols for each transmission span with the matrices M(m) and D(m) and provides detected symbols to RX data processor 470.

For the embodiment shown in FIG. 6A, RX data processor 470a includes a multiplexer/demultiplexer 668 and $N_D$ RX data stream processors 670a through 670nd for the $N_D$ data streams. Mux/Demux 668 receives and multiplexes/demultiplexes the $N_S$ detected symbol streams for the $N_S$ spatial channels into $N_D$ detected symbol streams for the $N_D$ data streams. Within each RX data stream processor 670, a symbol demapping unit 672 demodulates the detected symbols for the associated data stream in accordance with the modulation scheme used for that stream and provides demodulated data. A channel deinterleaver 674 deinterleaves the demodulated data in a manner complementary to the interleaving performed on that stream by access point 110. A decoder 676 decodes the deinterleaved data in a manner complementary to the encoding performed by access point 110 on that stream. For example, a Turbo decoder or a Viterbi decoder may be used for decoder 676 if Turbo or convolutional coding, respectively, is performed by access point 110. Decoder 676 provides a decoded data stream, which includes a decoded data packet for each data symbol block.

Figure 6B:
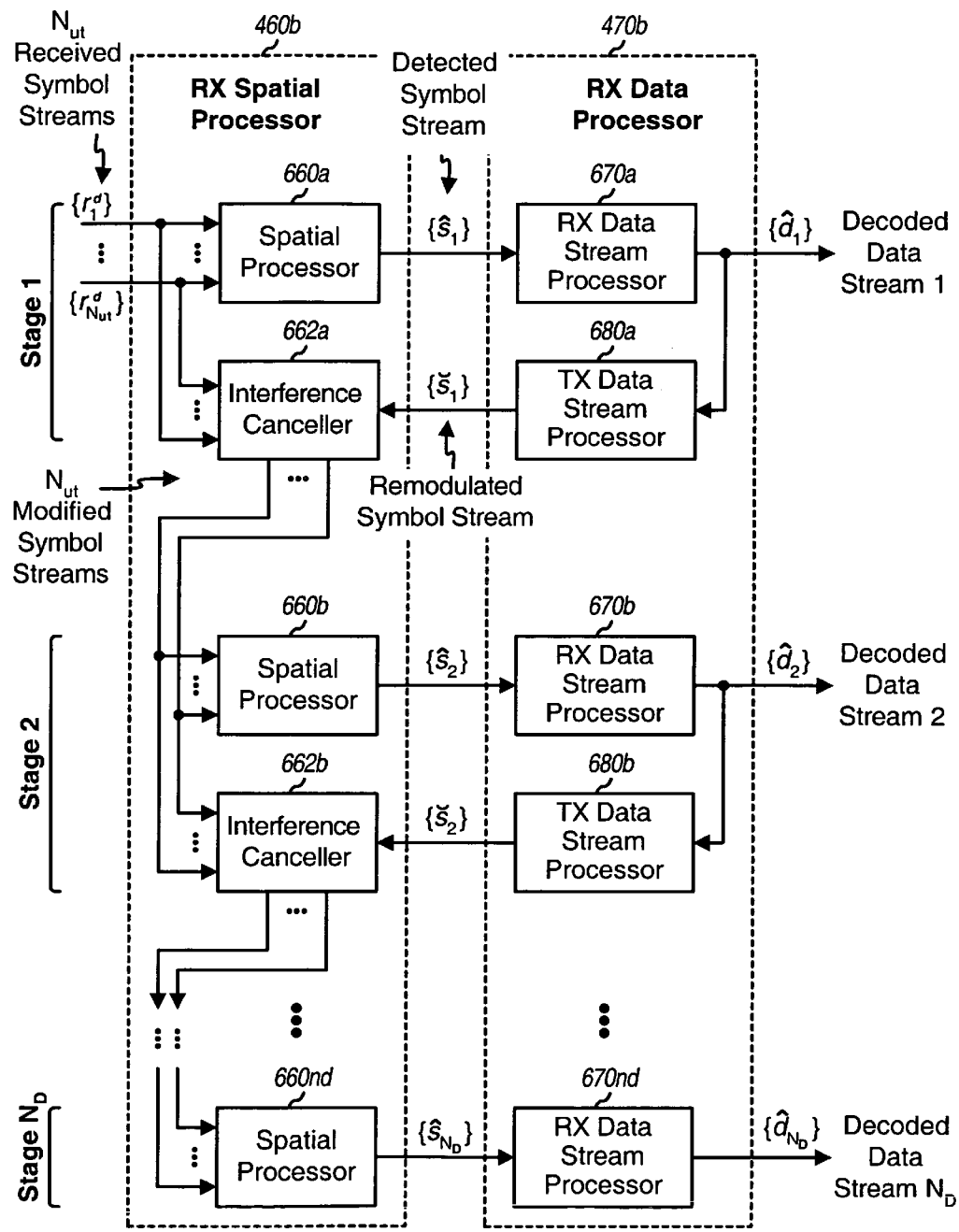

FIG. 6B shows a block diagram of an RX spatial processor 460b and an RX data processor 470b, which implement the SIC technique for user terminal 120. RX spatial processor 460b and RX data processor 470b implement $N_D$ cascaded receiver processing stages for the $N_D$ data streams. For simplicity, $N_D=N_S$ and each data symbol stream corresponds to a respective data stream. Each of stages 1 to $N_D-1$ includes a spatial processor 660, an interference canceller 662, an RX data stream processor 670, and a TX data stream processor 680. The last stage includes only a spatial processor 660nd and an RX data stream processor 670nd. Each RX data stream processor 670 includes a symbol demapping unit, a channel deinterleaver, and a decoder, as shown in FIG. 6A. Each TX data stream processor 680 includes an encoder, a channel interleaver, and a symbol mapping unit, as shown in FIG. 5B.

For stage 1, spatial processor 660a performs receiver spatial processing on the $N_{ut}$ received symbol streams and provides one detected symbol stream $\{\hat{s}_l\}$. RX data stream processor 670a demodulates, deinterleaves, and decodes the detected symbol stream $\{\hat{s}_l\}$ and provides a corresponding decoded data stream $\{\hat{d}_l\}$. TX data stream processor 680a encodes, interleaves, and modulates the decoded data stream $\{\hat{d}_l\}$ in the same manner performed by access point 110 for that stream and provides a remodulated symbol stream $\{\breve{s}_l\}$. Interference canceller 662a processes the remodulated symbol stream $\{\breve{s}_l\}$ with the estimated effective channel response matrix $\hat{H}_{eff}(m)$ to obtain $N_{ut}$ interference components due to data symbol stream $\{s_l\}$. The $N_{ut}$ interference components are subtracted from the $N_{ut}$ received symbol streams to obtain $N_{ut}$ modified symbol streams, which are provided to stage 2.

Each of stages 2 through $N_D-1$ performs the same processing as stage 1, albeit on the $N_{ut}$ modified symbol streams from the preceding stage instead of the $N_{ut}$ received symbol streams. The last stage performs spatial processing and decoding on the $N_{ut}$ modified symbol streams from stage $N_D-1$ and does not perform interference estimation and cancellation.

Spatial processors 660a through 660nd may each implement the CCMI, MMSE, or some other technique. Each spatial processor 660 multiplies an input (received or modified) symbol vector $r_{sic}^l(m)$ with a spatial filter matrix $M_{sic}^l(m)$ to obtain a detected symbol vector $\hat{s}_{sic}^l(m)$ and provides the detected symbol stream for that stage. The matrix $M_{sic}^l(m)$ is derived based on the reduced effective channel response estimate $\hat{H}_{eff}^l(m)$ for the stage.

2. MISO Broadcast

Figure 7:
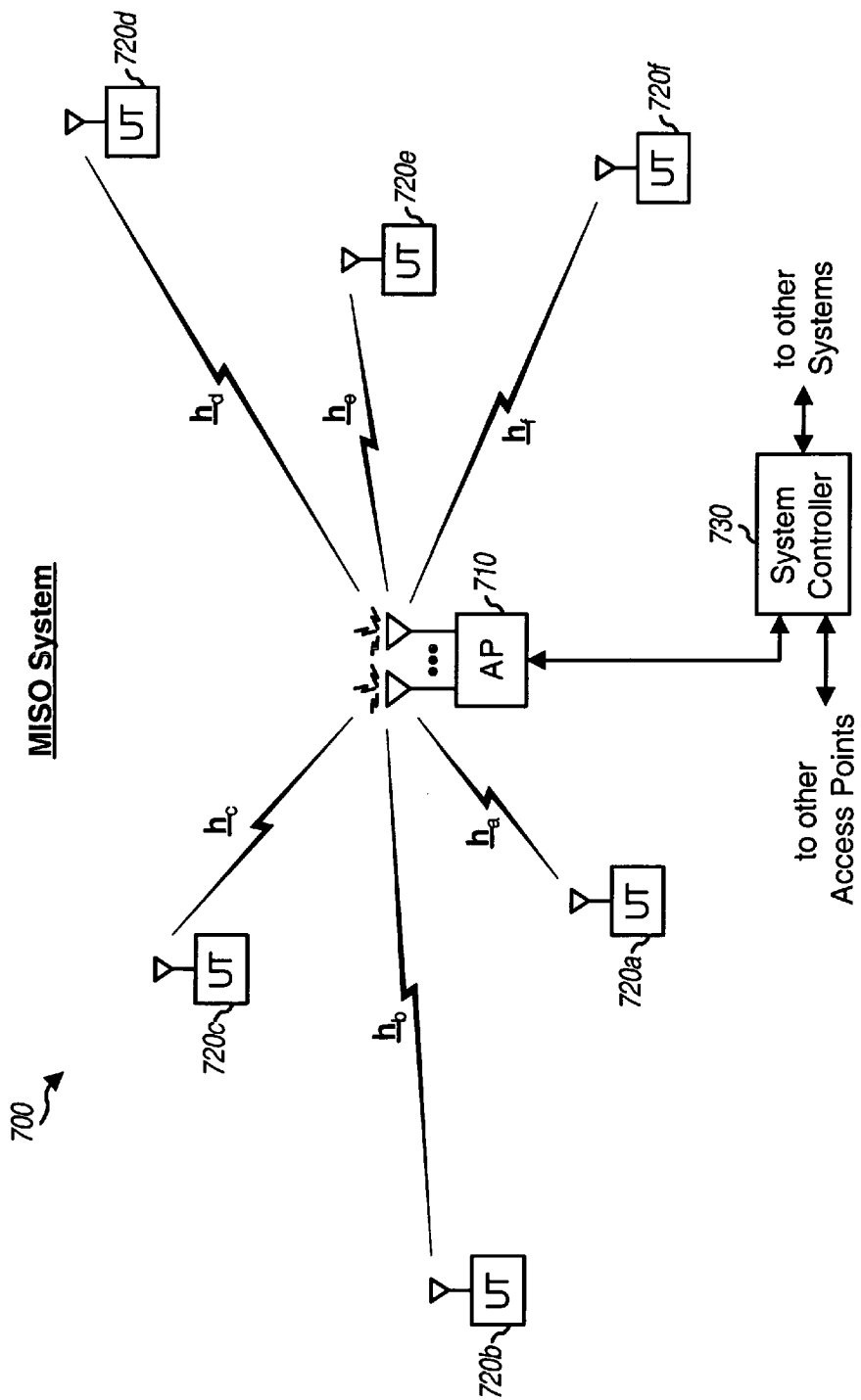
FIG. 7 shows a MISO system with an access point and single-antenna user terminals.

FIG. 7 shows a MISO system 700 with an access point 710 and user terminals 720. Access point 710 is equipped with multiple ($N_{ap}$) antennas for data transmission. Each user terminal 720 is equipped with a single antenna for data reception. The user terminals may be distributed throughout the coverage area of access point 710. A different MISO channel is formed by the $N_{ap}$ antennas at the access point and the single antenna at each user terminal. The MISO channel for a given user terminal may be characterized by a $1 \times N_{ap}$ channel response row vector h, which is $h=[h_1 \ h_2 \ \ldots \ h_{N_{ap}}]$, where entry $h_j$, for $j=1 \ldots N_{ap}$, denotes the coupling between access point antenna j and the user terminal antenna.

Spatial spreading may be used to randomize the effective MISO channel observed by each single-antenna user terminal so that broadcast performance is not dictated by the expected worst-case channel condition. For the MISO system, the access point performs spatial processing with steering vectors, which are degenerated steering matrices containing just one column.

The spatial processing at the access point for spatial spreading in the MISO system may be expressed as:

$$x_{miso}(m)=v(m) \cdot s(m), \quad \text{Eq (16)}$$

where s(m) is a data symbol to be sent in transmission span m;

v(m) is an $N_{ap} \times 1$ steering vector for transmission span m; and $x_{miso}(m)$ is an $N_{ap} \times 1$ vector with $N_{ap}$ transmit symbols to be sent from the $N_{ap}$ access point antennas in transmission span m.

A set of L steering vectors may be generated and is denoted as $\{v\}$, or v(i) for $i=1 \ldots L$. One steering vector in the set is selected for each transmission span m and used for spatial processing by the access point for that transmission span.

The received symbols at each single-antenna user terminal with spatial spreading may be expressed as:

$$r(m)=h(m) \cdot v(m) \cdot s(m)+n(m)=h_{eff}(m) \cdot s(m)+n(m), \quad \text{Eq.(17)}$$

where r(m) is a received symbol for transmission span m;

$h_{eff}(m)$ is an effective channel response for transmission span m, which is $h_{eff}(m)=h(m) \cdot v(m)$; and n(m) is the noise for transmission span m.

As shown in equation (17), because of the spatial spreading performed by the access point, the data symbol stream broadcast by the access point observes the effective channel response $h_{eff}(m)$, which includes the actual channel response h(m) and the steering vector v(m). The user terminal may derive h(m), which is an estimate of the channel response vector h(m) (e.g., based on received pilot symbols). The user terminal may then compute $\hat{h}_{eff}(m)$, which is an effective channel response estimate, as $\hat{h}_{eff}(m)=\hat{h}(m) \cdot v(m)$. Alternatively, the user terminal can directly estimate the effective channel response, e.g., based on received pilot symbols that have been transmitted using v(m). In any case, the user terminal can perform detection (e.g., matched filtering and/or equalization) on the received symbols r(m) with the effective channel response estimate $\hat{h}_{eff}(m)$ to obtain detected symbols $\hat{s}(m)$.

Broadcast transmission and reception for the MISO system may be performed similarly to that described above for FIGS. 2 and 3. However, only one spatial channel is available and used for broadcast transmission in the MISO system. Referring to FIG. 2, for broadcast transmission in the MISO system, one data symbol block is generated (block 212) and partitioned into $N_M$ subblocks, which are to be broadcast in $N_M$ transmission spans (block 214). A steering vector is selected for each subblock/transmission span (block 218) and used for spatial processing for the data symbol(s) in the subblock (block 220). The transmit symbols for each subblock are broadcast via the $N_{ap}$ access point antennas in the associated transmission span (block 222).

Referring to FIG. 3, for broadcast reception in the MISO system, one or more received data symbols are obtained from the single antenna at the user terminal for each subblock (block 314). The steering vector used by the access point for each subblock is determined (block 316) and used to derive the effective channel response estimate $\hat{h}_{eff}(m)$ (block 318), which is then used for detection of the received data symbol(s) for the subblock (block 320). After all $N_M$ subblocks for the current data symbol block have been received, the detected symbols for the block are processed (demodulated, deinterleaved, and decoded) to obtain the decoded data for the block (block 326).

Figure 8:
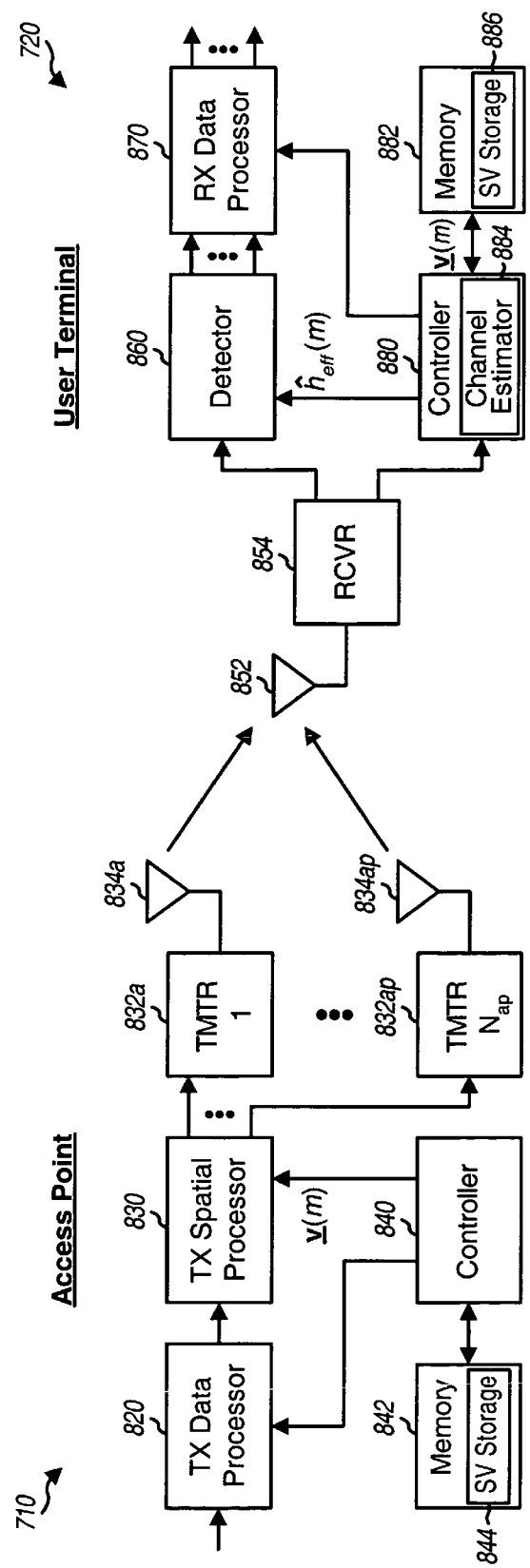
FIG. 8 shows a block diagram of the access point and single-antenna user terminal.

FIG. 8 shows a block diagram of access point 710 and user terminal 720 in MISO system 700. User terminal 720 is one of the user terminals in FIG. 7. At access point 710, a TX data processor 820 performs data processing on a data stream {d} to obtain a corresponding data symbol stream {s}. TX data processor 820 may be implemented with TX data stream processor 520 in FIG. 5B. A TX spatial processor 830 performs spatial spreading on the data symbol stream with the steering vectors (e.g., as shown in equation (16)), multiplexes in pilot symbols, and provides $N_{ap}$ transmit symbol streams. $N_{ap}$ transmitter units 832a through 832ap condition the $N_{ap}$ transmit symbol streams to generate $N_{ap}$ modulated signals, which are transmitted from $N_{ap}$ antennas 834a through 834ap, respectively.

At user terminal 720, the $N_{ap}$ transmitted signals are received by an antenna 852, and the received signal from the antenna is conditioned by a receiver unit 854 to obtain received symbols. A channel estimator 884 derives the effective channel response estimate $\hat{h}_{eff}(m)$ based on the received pilot symbols and the steering vector v(m) used for each transmission span. A detector 860 performs detection (e.g., matched filtering and/or equalization) on the received data symbols with the effective channel response estimate $\hat{h}_{eff}(m)$ and provides a stream of detected symbols {ŝ}. An RX data processor 870 processes (e.g., demaps, deinterleaves, and decodes) the detected symbol stream and provides a decoded data stream {d̂}. RX data processor 870 may be implemented with RX data stream processor 670a in FIG. 6A.

Controllers 840 and 880 control the operation of various processing units at access point 710 and user terminal 720, respectively. Memory units 842 and 882 store data and/or program codes used by controllers 840 and 880, respectively.

3. OFDM-Based Systems

The broadcast transmission techniques described herein may be used for single-carrier as well as multi-carrier systems. Multiple carriers may be obtained with OFDM or some other construct. For an OFDM-based system, spatial spreading may be performed on each of the subbands used for broadcast.

For a MIMO system that utilizes OFDM (i.e., a MIMO-OFDM system), one data symbol vector s(k,n) may be formed for each subband k in each OFDM symbol period n. Vector s(k,n) contains up to $N_S$ data symbols for broadcast via the $N_S$ spatial channels of subband k in OFDM symbol period n. The index m for transmission span is substituted with k,n for subband k and OFDM symbol period n. Up to $N_F$ vectors, s(k,n) for k=1 . . . $N_F$, may be broadcast concurrently on the $N_F$ subbands in one OFDM symbol period. A transmission span may cover one or more subbands in one or more OFDM symbol periods.

The $N_D$ data symbol blocks may be broadcast in various manners in the MIMO-OFDM system. For example, each data symbol block may be broadcast as one entry of the vector s(k,n) for each of the $N_F$ subbands. In this case, each data symbol block is broadcast on all $N_F$ subbands and achieves frequency diversity. Each data symbol block may further span one or multiple OFDM symbol periods. Each data symbol block may thus span frequency and/or time dimensions (by system design) plus spatial dimension (with spatial spreading).

The steering matrices may also be selected in various manners for the MIMO-OFDM system. The steering matrices for the subbands may be selected in a deterministic, pseudo-random, or permutated manner, as described above. For example, the L steering matrices in the set may be cycled through and selected in sequential order for subbands 1 through $N_F$ in OFDM symbol period n, then subbands 1 through $N_F$ in OFDM symbol period n+1, and so on. The number of steering matrices in the set may be less than, equal to, or greater than the number of subbands. The three cases described above for L=$N_M$, L<$N_M$, and L>$N_M$ may also be applied for the subbands, with $N_M$ being replaced with $N_F$.

For a MISO system that utilizes OFDM (i.e., a MISO-OFDM system), one data symbol s(k,n) may be broadcast on each subband k in OFDM symbol period n. Up to $N_F$ data symbols, s(k,n) for k=1 . . . $N_F$, may be broadcast concurrently on the $N_F$ subbands in one OFDM symbol period. Each data symbol block may be broadcast on one or multiple subbands and/or in one or multiple OFDM symbol periods. The steering vectors may be selected in a manner similar to that for the steering matrices in the MIMO-OFDM system.

For an OFDM-based system, each transmitter unit 432 in FIG. 4 and each transmitter unit 832 in FIG. 8 perform OFDM modulation on the transmit symbols for all $N_F$ subbands of an associated transmit antenna. For OFDM modulation, the $N_F$ transmit symbols to be broadcast on the $N_F$ subbands in each OFDM symbol period are transformed to the time-domain using an $N_F$-point inverse fast Fourier transform (IFFT) to obtain a "transformed" symbol that contains $N_F$ chips. To combat intersymbol interference (ISI), which is caused by frequency selective fading, a portion (or $N_{cp}$ chips) of each transformed symbol is typically repeated to form a corresponding OFDM symbol. Each OFDM symbol is broadcast in one OFDM symbol period, which is $N_F+N_{cp}$ chip periods, where $N_{cp}$ is the cyclic prefix length. Each transmitter unit generates a stream of OFDM symbols and further conditions the OFDM symbol stream to generate a modulated signal for broadcast from the associated antenna. Each receiver unit 454 in FIG. 4 and each receiver unit 854 in FIG. 8 perform the complementary OFDM demodulation on its received signal to obtain received data symbols and received pilot symbols.

4. Transmit Diversity

Spatial spreading may be used in combination with various transmit diversity schemes such as space-time transmit diversity (STTD), space-frequency transmit diversity (SFTD), orthogonal transmit diversity (OTD), and so on. STTD transmits each pair of data symbols from two antennas in two symbol periods to achieve space and time diversity. SFTD transmits each pair of data symbols from two antennas in two subbands to achieve space and frequency diversity. OTD transmits two data symbols simultaneously from two antennas in two symbol periods using two orthogonal codes to achieve space and time diversity. Spatial spreading may provide improved performance for these transmit diversity schemes.

For the STTD scheme, the access point generates two coded symbol vectors, e.g., $s_1(m)=[s_a(m) \; s_b(m)]^T$ and $s_2(m)= [s^*_b(m) -s^*_a(m)]^T$, for each pair of data symbols $s_a(m)$ and $s_b(m)$ to be broadcast in transmission span m, where "*" denotes the complex conjugate and "T" denotes the transpose. Each vector includes two coded symbols that are to be broadcast from the $N_{ap}$ access point antennas in one symbol period. Vector $s_1(m)$ is broadcast in the first symbol period, and vector $s_2(m)$ is broadcast in the next symbol period. Each data symbol is included in both vectors and is thus broadcast over two symbol periods.

The access point performs spatial spreading on the two vectors $s_1(m)$ and $s_2(m)$ using the same steering matrix, as follows:

$$x_{sttd,i}(m) = V_{sttd}(m) \cdot s_i(m), \text{ for } i=1, 2, \quad \text{Eq (18)}$$

where $V_{sttd}(m)$ is an $N_{ap} \times 2$ steering matrix for transmission span m; and $x_{sttd,i}(m)$ is an $N_{ap} \times 1$ vector with $N_{ap}$ transmit symbols to be sent from the $N_{ap}$ access point antennas in symbol period i of transmission span m.

If the user terminal is equipped with a single antenna, then the received symbols may be expressed as:

$$r_i(m) = h(m) \cdot V_{sttd}(m) \cdot s_i(m) + n_i(m) = h_{eff,sttd}(m) \cdot s_i(m) + n_i(m), \quad \text{Eq (19)}$$

where $r_i(m)$ is a received symbol for symbol period i of transmission span m;

h(m) is an $1 \times N_{ap}$ channel response row vector for transmission span m;

$h_{eff,sttd}(m)$ is a $1 \times 2$ effective channel response row vector for transmission span m, which is $h_{eff,sttd}(m) = h(m) \cdot V_{sttd}(m) = [h_{eff,1}(m) \ h_{eff,2}(m)]$; and $n_i(m)$ is the noise for symbol period i of transmission span m.

The channel response h(m) is assumed to be constant over the two symbol periods of transmission span m.

The single-antenna user terminal may derive estimates of the two data symbols, $s_a(m)$ and $s_b(m)$, as follows:

$$\hat{s}_a(m) = \frac{\hat{h}^*_{eff,1}(m) \cdot r_1(m) - \hat{h}_{eff,2}(m) \cdot r_2^*(m)}{\beta'(m)} = \quad \text{Eq (20)}$$
$$s_a(m) + n'_a(m), \text{ and}$$

$$\hat{s}_b(m) = \frac{\hat{h}^*_{eff,2}(m) \cdot r_1(m) + \hat{h}_{eff,1}(m) \cdot r_2^*(m)}{\beta'(m)} =$$
$$s_b(m) + n'_b(m),$$

where $\hat{h}_{eff,i}(m)$ is an estimate of $h_{eff,i}(m)$, for i=1, 2;

$\beta'(m) = |\hat{h}_{eff,1}(m)|^2 + |\hat{h}_{eff,2}(m)|^2$; and $n'_a(m)$ and $n'_b(m)$ are post-processed noise for detected symbols $\hat{s}_a(m)$ and $\hat{s}_b(m)$, respectively.

If the user terminal is equipped with multiple antennas, then the received symbols may be expressed as:

$$r_i(m) = H(m) \cdot V_{sttd}(m) \cdot s_i(m) + n_i(m) = H_{eff,sttd}(m) \cdot s_i(m) + n_i(m), \quad \text{Eq (21)}$$

where $r_i(m)$ is an $N_{ut} \times 1$ vector with $N_{ut}$ received symbols for symbol period i of transmission span m;

H(m) is an $N_{ut} \times N_{ap}$ channel response matrix for transmission span m;

$H_{eff,sttd}(m)$ is an $N_{ut} \times 2$ effective channel response matrix for transmission span m, which is $H_{eff,sttd}(m) = H(m) \cdot V_{sttd}(m) = [h_{eff,1}(m) \ h_{eff,2}(m)]$; and $n_i(m)$ is a noise vector for symbol period i of transmission span m.

The channel response H(m) is assumed to be constant over the two symbol periods of transmission span m.

The multi-antenna user terminal may derive estimates of the two data symbols, $s_a(m)$ and $s_b(m)$, as follows:

$$\hat{s}_a(m) = \frac{\hat{h}^H_{eff,1}(m) \cdot r_1(m) - r_2^H(m) \cdot \hat{h}_{eff,2}(m)}{\beta''(m)} = \quad \text{Eq (22)}$$
$$s_a(m) + n''_a(m), \text{ and}$$

$$\hat{s}_b(m) = \frac{\hat{h}^H_{eff,2}(m) \cdot r_1(m) + r_2^H(m) \cdot \hat{h}_{eff,1}(m)}{\beta''(m)} =$$
$$s_b(k) + n''_b(m),$$

where $\hat{h}_{eff,i}(m)$ is an estimate of $h_{eff,i}(m)$, for i=1, 2;

$\beta''(m) = \|\hat{h}_{eff,1}(m)\|^2 + \|\hat{h}_{eff,2}(m)\|^2$; and $n''_a(m)$ and $n''_b(m)$ are post-processed noise for detected symbols $\hat{s}_a(m)$ and $\hat{s}_b(m)$, respectively.

For the SFTD scheme, the two vectors $s_1(m)$ and $s_2(m)$ are broadcast on two different subbands in the same symbol period. The same transmit and receive processing described above can be performed for the SFTD scheme, where the index i now denotes subband instead of symbol period. Since the channel response is assumed to be approximately constant over the transmission span, two adjacent subbands k and k+1 may be used to broadcast the two vectors $s_1(m)$ and $s_2(m)$.

5. Hybrid Multi-Antenna System

Figure 9:
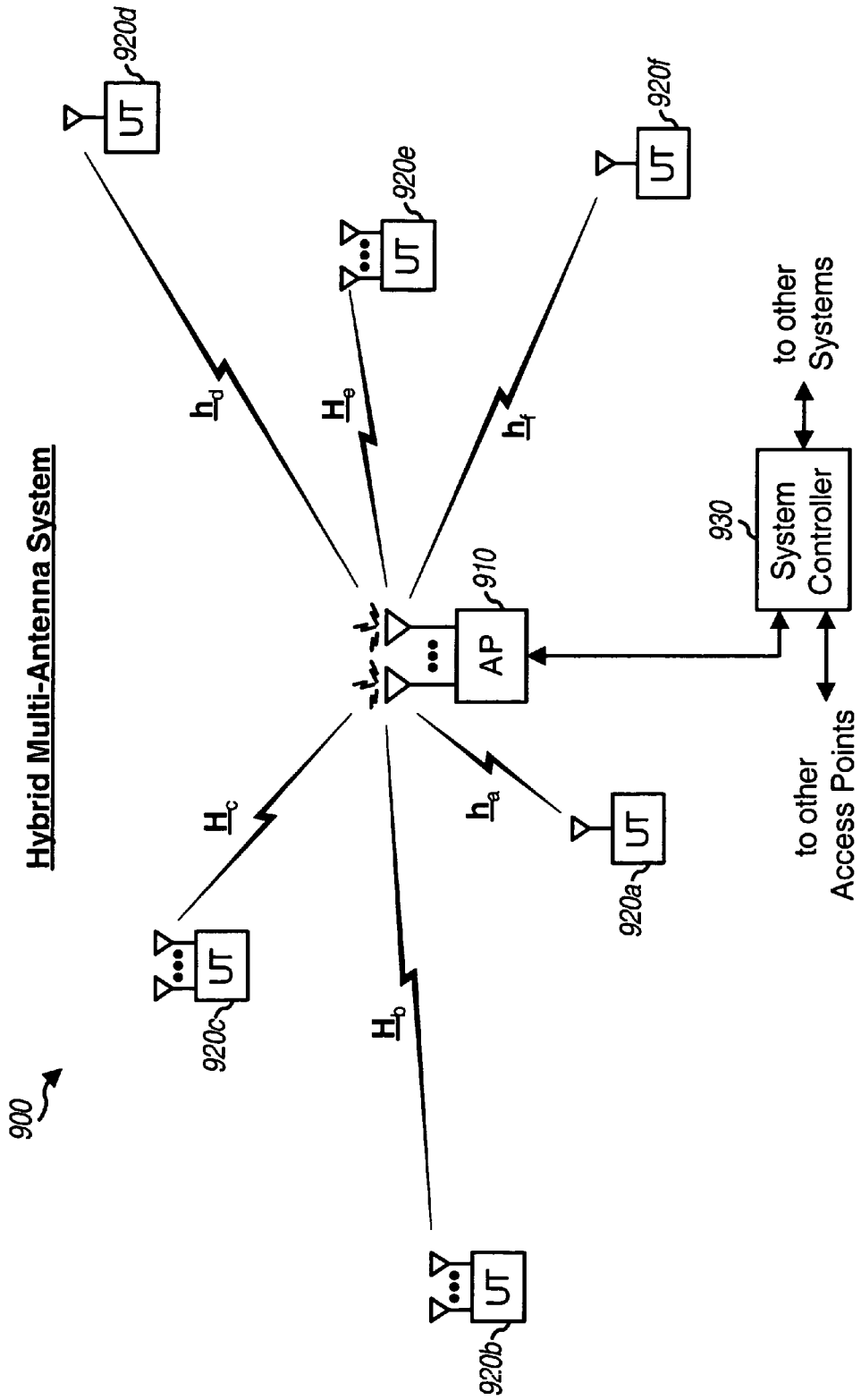
FIG. 9 shows a hybrid multi-antenna system with an access point and single-antenna and multi-antenna user terminals.

FIG. 9 shows a multi-antenna system 900 with an access point 910 and user terminals 920. Access point 910 is equipped with multiple ($N_{ap}$) antennas for data transmission. Each user terminal 920 may be equipped with a single antenna or multiple ($N_{ut}$) antennas for data reception. Each multi-antenna user terminal has a respective MIMO channel with the access point and is able to receive MIMO and MISO broadcast transmission from the access point. Each single-antenna user terminal has a respective MISO channel with the access point and is able to receive a MISO broadcast transmission and possibly a portion of a MIMO broadcast transmission from the access point, as described below.

Access point 910 may broadcast data in various manners in system 900. In one embodiment, access point 910 sends (1) a MIMO broadcast transmission that can be received by multi-antenna user terminals and (2) a MISO broadcast transmission that can be received by both single-antenna and multi-antenna user terminals. The MIMO and MISO broadcast transmissions may be sent (1) in different time intervals using time division multiplexing (TDM), (2) on different disjoint sets of subbands using frequency division multiplexing (FDM), (3) on different code channels using code division multiplexing (CDM), some other multiplexing scheme, or any combination thereof. In another embodiment, access point 910 sends a MIMO broadcast transmission in a manner such that single-antenna user terminals can recover a portion of the broadcast transmission (e.g., for basic broadcast service) and multi-antenna user terminals can recover all of the broadcast transmission (if they have sufficient link margin). In yet another embodiment, access point 910 can adjust the broadcast transmission (e.g., between MIMO and MISO broadcasts) based on the expected channel conditions for the user terminals.

6. Broadcast Transmission Schemes

A multi-antenna system may perform MIMO broadcast in various manners. In a first MIMO broadcast scheme, the access point broadcasts multiple ($N_D$) data streams simultaneously and uses the same data rate and the same transmit power for all data streams, where $N_S \geq N_D > 1$. The data rate may be selected, for example, based on the expected worst-case effective channel for the multi-antenna user terminals, which should be better than the expected worst-case actual channel for these user terminals. Most multi-antenna user terminals within the broadcast coverage area can then recover the $N_D$ data streams.

In a second MIMO broadcast scheme, the access point broadcasts $N_D$ data streams simultaneously and uses different data rates but the same transmit power for these streams. This broadcast scheme may be used to provide "tiered" broadcast services over the broadcast coverage area. Each data stream has a different broadcast coverage area determined by its data rate. The data stream with the lowest data rate has the largest broadcast coverage area, and the data stream with the highest data rate has the smallest broadcast coverage area. Each user terminal may be able to recover one, some, or all of the data streams depending on (1) its location and channel condition and (2) the receiver spatial processing technique employed. If a user terminal uses a linear receiver spatial processing technique (e.g., the CCMI or MMSE technique), then it can recover data streams with higher data rates if it has a sufficiently high link margin. The user terminal may be able to only recover data streams with lower data rates if it has a low link margin (e.g., is located at the edge of the coverage area). If the user terminal uses the SIC technique, then it may be able to recover data streams with higher data rates as well as data streams with lower data rates even if it is located at the edge of the coverage area. The user terminal can recover the lower rate data streams first and perform interference cancellation to achieve higher SNRs needed to recover the higher rate data streams.

In a third MIMO broadcast scheme, the access point broadcasts $N_D$ data streams simultaneously and uses the same data rate but different transmit powers for these streams. Different transmit powers may be obtained by multiplying the data symbols for each data stream with a scaling factor that determines the amount of transmit power for that data stream. Tiered broadcast services may also be achieved with this broadcast scheme. The data stream with the highest transmit power has the largest broadcast coverage area and can be recovered by the most user terminals. Conversely, the data stream with the lowest transmit power has the smallest broadcast coverage area. The lower power data streams may also be recovered by user terminals with low link margin if they use the SIC technique.

The second and third MIMO broadcast schemes may be used to support both multi-antenna user terminals and single-antenna user terminals. The single-antenna user terminals can recover the data stream with the lowest data rate or the highest transmit power. The remaining data streams would act as interference to this data stream. The multi-antenna user terminals can recover more data streams using the additional antennas. If a multi-antenna user terminal uses the SIC technique described above, then the data streams may be recovered in a sequential order determined by their required SNRs. The data stream with the lowest data rate or the highest transmit power is recovered first, followed by the data stream with the next lowest data rate or next highest transmit power, and so on.

In a fourth MIMO broadcast scheme, the access point transmits different numbers of data streams depending on the expected capacity of the wireless channels for the user terminals. Channel capacity is a function of the operating SNR as well as the channel characteristics (e.g., whether the channel gains for different transmit/receive antenna pairs are correlated). When the expected channel capacity is low, the access point can broadcast fewer data streams and distribute the available transmit power over these fewer streams so that each stream can achieve a higher SNR. Conversely, when the expected channel capacity is higher, the access point can broadcast more data streams.

For both MIMO and MISO broadcasts, the access point can adjust the data rate for each data stream based on various factors such as channel capacity, service requirements, and so on. Other broadcast schemes may also be implemented with spatial spreading, and this is within the scope of the invention.

7. Broadcast Performance

The performance of each data symbol stream is dependent on the diversity order achieved for that stream. The diversity order for each data symbol stream is, in turn, dependent on the number of transmit antennas, the number of receive antennas, the receiver spatial processing technique, and whether spatial spreading was used. In general, performance improves as diversity order increases.

Without spatial spreading, each of the $N_S$ data symbol streams observes the same diversity order when a linear receiver spatial processing technique (e.g., the CCMI or MMSE technique) is used to detect the data symbol streams. If $N_{ut} \geq N_{ap}$ and one data symbol stream is broadcast on each spatial channel of $H_{eff}(m)$ so that $N_D = N_S = N_{ap}$, then each data symbol stream observes a diversity order of $N_{ut} - N_{ap} + 1$. For a symmetric MIMO channel with $N_{ap} = N_{ut}$, each detected symbol stream has a diversity order of one and a Rayleigh distribution for its SNR. All of the data symbol streams have the same SNR distribution.

Without spatial spreading, each data symbol stream observes a different diversity order when the SIC technique is used to detect the $N_S$ data symbol streams. Again, if $N_{ut} \geq N_{ap}$ and one data symbol stream is broadcast on each spatial channel of $H_{eff}(m)$, then the diversity order for each data symbol stream is $N_{ut} - N_{ap} + l$, where l is the stage number in which the stream is detected. Thus, data symbol streams that are detected later have higher diversity order and tend to have better SNRs, which allow higher data rates to be used for these streams.

With spatial spreading, the diversity order for each data symbol stream is effectively improved by the use of multiple different steering matrices for each code block within the stream. Each different steering matrix allows the code block to obtain a different "look" of the MIMO channel, which may be equated to having a different transmit or receive antenna. The diversity order for each data symbol stream may then be related to the number of different steering matrices used for the code block, which can be much larger than the number of access point antennas and the number of user terminal antennas. Spatial spreading typically provides greater improvement for data symbol streams with lower diversity orders.

Spatial spreading can be used to improve the throughput and/or the coverage area for a broadcast transmission. Conventional MIMO and MISO systems (without spatial spreading) typically select a data rate for broadcast transmission based on the expected worst-case channel condition for all user terminals in the broadcast coverage area. This worst-case channel condition typically corresponds to a "bad" channel that does not fade/change across an entire code block. With spatial spreading, the effective MIMO or MISO channel is randomized across each code block, and the likelihood of any user terminal observing a bad channel for the entire code block is substantially reduced. This then allows a higher data rate to be used for broadcast transmission. Equivalently, for a given data rate, spatial spreading can provide a larger broadcast coverage area. In general, a higher data rate for a broadcast transmission corresponds to a smaller broadcast coverage area. Furthermore, a more stringent outage requirement (or a lower outage probability) corresponds to a smaller broadcast coverage area. Spatial spreading can provide improved performance (e.g., higher data rate, larger broadcast coverage area, and/or lower outage probability) over the conventional MIMO and MISO systems.

Figure 10A:
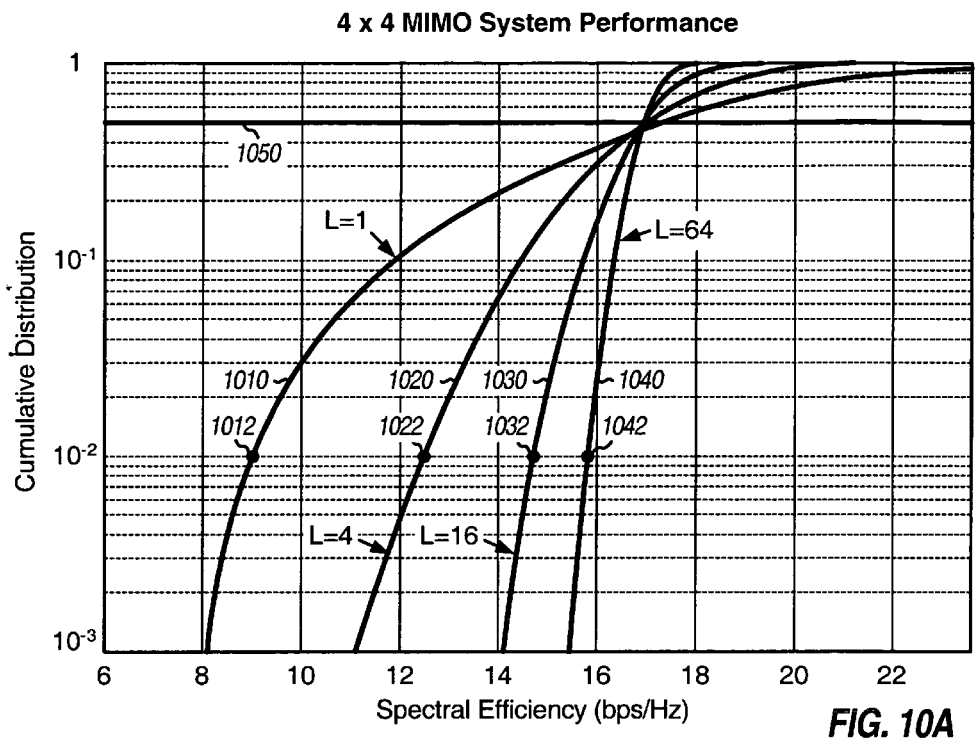
FIGS. 10A and 10B show plots of overall spectral efficiency achieved for a 4×4 MIMO system and a 4×1 MISO system, respectively.

FIG. 10A shows plots of the cumulative distribution function (CDF) of the overall spectral efficiency achieved for an exemplary MIMO system. For this MIMO system, the access point is equipped with four antennas ($N_{ap}=4$), the user terminals are randomly distributed throughout the coverage area, and each user terminal is equipped with four antennas ($N_{ut}=4$). The MIMO channels for the user terminals are assumed to be as described above for equation (1) and the operating SNR per receive antenna is 20 dB for user terminals located at the edge of coverage. The user terminals use the MMSE technique.

Plot 1010 shows the CDF of the overall spectral efficiency for the case in which spatial spreading is not performed for broadcast transmission, which is equivalent to performing transmit steering with a single steering matrix (L=1) all the time. Spectral efficiency is given in units of bits per second per Hertz (bps/Hz). For a given spectral efficiency x, the CDF indicates the percentage of user terminals achieving overall spectral efficiency worse than x. For example, point 1012 indicates that one percent ($10^{-2}$) of the user terminals achieve overall spectral efficiency worse than 9 bps/Hz. If the access point broadcasts data at an overall rate of 9 bps/Hz, then one percent of the user terminals will not be able to correctly decode the broadcast transmission. This percentage is also referred to as the outage probability.

Plots 1020, 1030 and 1040 show the CDFs of the overall spectral efficiency achieved with spatial spreading using 4, 16 and 64 steering matrices, respectively. Points 1022, 1032 and 1042 indicate that, for one percent outage probability, the overall spectral efficiency is 12.5, 14.6 and 15.8 bps/Hz with 4, 16 and 64 steering matrices, respectively. For one percent outage probability, the use of spatial spreading improves the overall spectral efficiency from 9 bps/Hz to approximately 15.8 bps/Hz (with 64 steering matrices) for the exemplary MIMO system. Line 1050 is for 50% outage probability and may be referenced to determine the average overall spectral efficiency for the four cases.

Figure 10B:
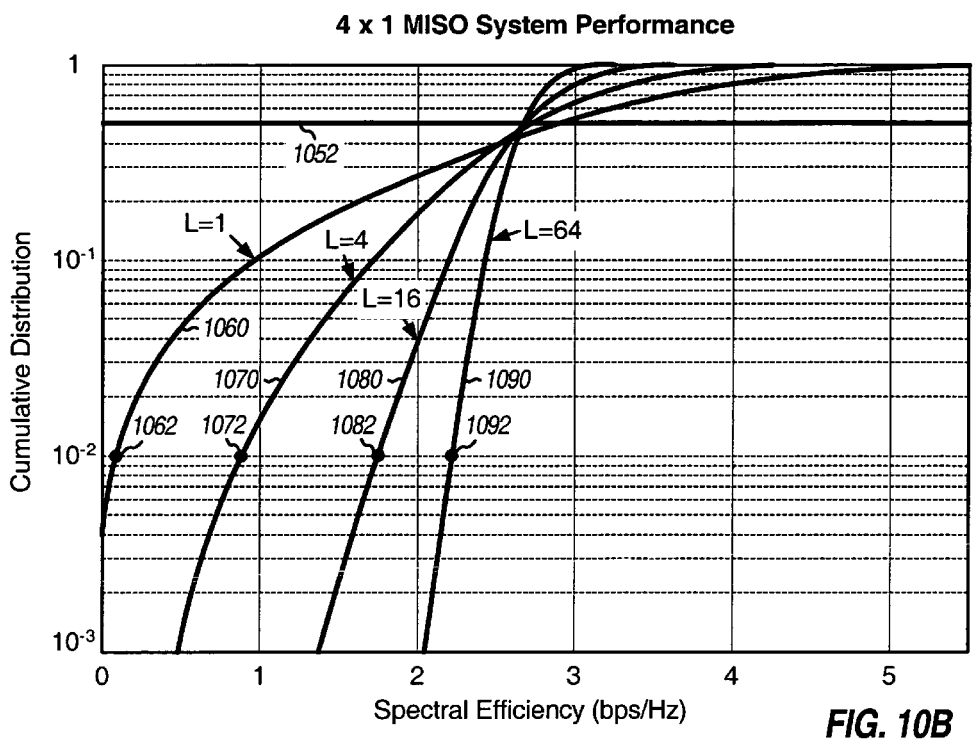

FIG. 10B shows plots of the CDF of the overall spectral efficiency achieved for an exemplary MISO system. For this MISO system, the access point is equipped with four antennas ($N_{ap}=4$), the user terminals are randomly distributed throughout the coverage area, and each user terminal is equipped with a single antenna ($N_{ut}=1$). The MISO channels for the user terminals are assumed to be as described above and the operating SNR/Rx is 10 dB for user terminals located at the edge of coverage.

Plot 1060 shows the CDF of the overall spectral efficiency for the case in which spatial spreading is not performed (L=1) for broadcast transmission. Plots 1070, 1080 and 1090 show the CDFs of the overall spectral efficiency achieved with spatial spreading using 4, 16 and 64 steering matrices, respectively. Points 1062, 1072, 1082, and 1092 indicate that, for one percent outage probability, the overall spectral efficiency is 0.1, 0.8, 1.7, and 2.2 bps/Hz with 1, 4, 16 and 64 steering matrices, respectively. Again, substantial gain is achieved by the use of spatial spreading for broadcast transmission.

FIGS. 10A and 10B show the performance for exemplary MIMO and MISO systems with some specific assumptions. In general, the amount of improvement may be dependent on various factors such as, for example, the characteristics of the wireless channels, the number of transmit and receive antennas, the spatial processing technique used at the user terminals, the coding and modulation schemes used for data transmission, and so on.

8. Steering Matrix and Vector Generation

The steering matrices used for spatial spreading in the MIMO system and the steering vectors used for the MISO system may be generated in various manners. Some exemplary schemes for generating these steering matrices and vectors are described below. The set of steering matrices/vectors may be pre-computed and stored at the access point and user terminals and thereafter retrieved for use as they are needed. Alternatively, these steering matrices/vectors may be computed in real time as they are needed.

A. Steering Matrix Generation

The steering matrices should be unitary matrices and satisfy the following condition:

$$V^H(i) \cdot V(i) = I, \text{ for } i=1 \ldots L. \qquad \text{Eq (23)}$$

Equation (23) indicates that each column of V(i) has unit energy and the columns of V(i) are orthogonal to one another. This condition ensures that the $N_S$ data symbols broadcast simultaneously using the steering matrix V(i) have the same power and are orthogonal to one another prior to transmission.

Some of the steering matrices may also be uncorrelated so that the correlation between any two uncorrelated steering matrices is zero or a low value. This condition may be expressed as:

$$C(ij) = V^H(i) \cdot V(j) \approx 0, \text{ for } i=1 \ldots L, j=1 \ldots L, \text{ and } i \neq j, \qquad \text{Eq (24)}$$

where C(ij) is the correlation matrix for V(i) and V(j) and 0 is a matrix of all zeros. The condition in equation (24) may improve performance for some applications but is not necessary for most applications.

A set of L steering matrices {V} may be generated using various schemes. In a first scheme, the L steering matrices are generated based on matrices of random variables. An $N_S \times N_{ap}$ matrix G with elements that are independent identically distributed (IID) complex Gaussian random variables, each having zero mean and unit variance, is initially generated. An $N_{ap} \times N_{ap}$ correlation matrix of G is computed as $R = G^H \cdot G$ and decomposed using eigenvalue decomposition as:

$$R = E \cdot D \cdot E^H, \qquad \text{Eq (25)}$$

where E is an $N_{ap} \times N_S$ unitary matrix of eigenvectors of R; and

D is an $N_S \times N_S$ diagonal matrix of eigenvalues of R.

The diagonal matrix D contains eigenvalues of R, which represent the power gains for the $N_S$ eigenmodes of G. The matrix E is used as a steering matrix V(i) and added to the set. The steering matrix V(i) is a unitary matrix because the matrix E is obtained through eigenvalue decomposition. The process is repeated until all L steering matrices are generated.

In a second scheme, the L steering matrices are generated based on a set of ($\log_2 L$)+1 independent isotropically distributed unitary matrices. A random unitary matrix is isotropically distributed if its probability density is unchanged by pre-multiplication by any deterministic $N_{ap} \times N_{ap}$ unitary matrix. The index i for the steering matrices in the set may be denoted as $i=l_1 l_2 \ldots l_Q$, where $Q=\log_2 L$, $l_1$ is the first bit of index i, $l_Q$ is the last bit of index i, and each bit can take on a value of either 0 or 1. The L steering matrices may then be generated as follows:

$$V(l_1 l_2 \ldots l_Q) = \Omega_1^{l_1} \cdot \Omega_2^{l_2} \cdot \ldots \cdot \Omega_Q^{l_Q} \cdot V_0, \text{ for } l_1, l_2, \ldots, l_Q \in \{0,1\}, \quad \text{Eq (26)}$$

where $V_0$ is an $N_{ap} \times N_S$ independent isotropically distributed unitary matrix; and $\Omega_j^{l_j}$, for $j=1 \ldots Q$, is an $N_{ap} \times N_{ap}$ independent isotropically distributed unitary matrix.

The matrix $V_0$ may be defined, for example, as $V_0^T = [I_{N_S} \ 0]$, where $I_{N_S}$ is an $N_S \times N_S$ identity matrix. The second scheme is described by T. L. Marzetta et al. in "Structured Unitary Space-Time Autocoding Constellations," IEEE Transaction on Information Theory, Vol. 48, No. 4, April 2002.

In a third scheme, the L steering matrices are generated by successively rotating an initial unitary steering matrix $V(1)$ in an $N_{ap}$-dimensional complex space, as follows:

$$V(i+1) = \Theta^i \cdot V(1), \text{ for } i=1 \ldots L-1, \quad \text{Eq (27)}$$

where $\Theta^i$ is an $N_{ap} \times N_{ap}$ diagonal unitary matrix that may be defined as:

$$\Theta^i = \begin{bmatrix} e^{j2\pi \cdot \mu_1 \cdot i/L} & 0 & \cdots & 0 \\ 0 & e^{j2\pi \cdot \mu_2 \cdot i/L} & \cdots & 0 \\ \vdots & \vdots & \ddots & \vdots \\ 0 & 0 & \cdots & e^{j2\pi \cdot u_{N_{ap}} \cdot i/L} \end{bmatrix}, \quad \text{Eq (28)}$$

and $u_1, u_2, \ldots u_{N_{ap}}$ are $N_{ap}$ different values, each within the range of 0 to L−1, which ar chosen such that, e.g., the correlation between the resulting steering matrices generated with the matrix $\Theta^i$ is as low as possible. The $N_{ap}$ diagonal elements of $\Theta^i$ are L-th roots of unity. The initial unitary steering matrix $V(1)$ may be formed with $N_S$ different columns of an $N_{ap} \times N_{ap}$ Fourier matrix where the (n,m)-th entry, $w_{n,m}$, is given as:

$$w_{n,m} = e^{-j2\pi \frac{(n-1)(m-1)}{N_{ap}}}, \quad \text{Eq (29)}$$

for $n = \{1 \ldots N_{ap}\}$ and $m = \{1 \ldots N_{ap}\}$, where n is a row index and m is a column index. The third scheme is described by B. M. Hochwald et al. in "Systematic Design of Unitary Space-Time Constellations," IEEE Transaction on Information Theory, Vol. 46, No. 6, September 2000.

In a fourth scheme, the L steering matrices are generated with a base matrix B and different scalars. The base matrix may be a Walsh matrix, a Fourier matrix, or some other matrix. A 2×2 Walsh matrix may be expressed as $$\underline{W}_{2 \times 2} = \begin{bmatrix} 1 & 1 \\ 1 & -1 \end{bmatrix}.$$

A larger size Walsh matrix $W_{2N \times 2N}$ may be formed from a smaller size Walsh matrix $W_{N \times N}$, as follows:

$$\underline{W}_{2N \times 2N} = \begin{bmatrix} \underline{W}_{N \times N} & \underline{W}_{N \times N} \\ \underline{W}_{N \times N} & -\underline{W}_{N \times N} \end{bmatrix}. \quad \text{Eq (30)}$$

Walsh matrices have dimensions that are powers of two. An $N_{ap} \times N_{ap}$ Fourier matrix F may be formed with elements defined as shown in equation (29).

An $N_{ap} \times N_{ap}$ Walsh matrix W, Fourier matrix F, or some other matrix may be used as the base matrix B to form other steering matrices. Each of rows 2 through $N_{ap}$ of the base matrix may be independently multiplied with one of M different possible scalars, where M>1. $M^{N_{ap}-1}$ different steering matrices may be obtained from $M^{N_{ap}-1}$ different permutations of the M scalars for the $N_{ap}-1$ rows. For example, each of rows 2 through $N_{ap}$ may be independently multiplied with a scalar of +1, −1, +j, or −j, where $j=\sqrt{-1}$. For $N_{ap}=4$ and M=4, 64 different steering matrices may be generated from the base matrix B with the four different scalars. Additional steering matrices may be generated with other scalars, e.g., $e^{\pm j3\pi/4}$, $e^{\pm j\pi/4}$, $e^{\pm j\pi/8}$, and so on. In general, each row of the base matrix may be multiplied with any scalar having the form $e^{j\theta}$, where $\theta$ may be any phase value. $N_{ap} \times N_{ap}$ steering matrices may be generated as $V(i) = g_{N_{ap}} \cdot B(i)$, where $g_{N_{ap}} = 1/\sqrt{N_{ap}}$ and $B(i)$ is the i-th matrix generated with the base matrix B. The scaling by $g_{N_{ap}}$ ensures that each column of $V(i)$ has unit power.

Other schemes may also be used to generate the set of L steering matrices, and this is within the scope of the invention. In general, the steering matrices may be generated in a pseudo-random manner (e.g., such as the first scheme) or a deterministic manner (e.g., such as the second, third, and fourth schemes).

B. Steering Vector Generation

The steering vectors used for spatial spreading in a MISO system should have unit energy, which is $\|v(i)\|^2 = v^H(i) \cdot v(i) = 1$ for $i=1 \ldots L$, so that the transmit power used for the data symbols is not varied by the spatial spreading. The elements of each steering vector $v(i)$ may be defined to have equal magnitude so that the full transmit power of each access point antenna can be used for broadcast. This condition may be expressed as: $|v_1(i)| = |v_2(i)| = \ldots = |v_{N_{ap}}(i)|$, where $v(i) = [v_1(i) \ v_2(i) \ \ldots \ v_{N_{ap}}(i)]$. Some of the steering vectors may also be uncorrelated so that the correlation between any two uncorrelated steering vectors is zero or a low value. This condition may be expressed as:

$$c(ij) = v^H(i) \cdot v(j) \approx 0, \text{ for } i=1 \ldots L, j=1 \ldots L, \text{ and } i \neq j, \quad \text{Eq (31)}$$

where $c(ij)$ is the correlation between steering vectors $v(i)$ and $v(j)$.

The set of L steering vectors $\{v\}$ may be generated using various schemes. In a first scheme, the L steering vectors are generated based on $N_{ap} \times N_{ap}$ matrices G' of random variables. An $N_{ap} \times N_{ap}$ correlation matrix of each matrix G' is computed as $R' = G'^H \cdot G'$ and decomposed as shown in equation (25) to obtain an $N_{ap} \times N_{ap}$ unitary matrix E'. Each column of E' may be used as a steering vector $v(i)$.

In a second scheme, the L steering vectors are generated by successively rotating an initial unitary steering vector $v(1)$ as follows:

$$v(i+1) = e^{j2\pi i/L} \cdot v(i), \text{ for } i=2 \ldots L, \quad \text{Eq (32)}$$

where $L \geq N_{ap}$.

In a third scheme, the L steering vectors are generated such that the elements of these vectors have the same magnitude but different phases. For a given steering vector $v(i)=[v_1(i) \ v_2(i) \ldots v_{N_{ap}}(i)]$, a normalized steering vector $\tilde{v}(i)$ may be formed as:

$$\tilde{v}(i)=[Ae^{j\theta_1(i)} \ Ae^{j\theta_2(i)} \ldots Ae^{j\theta_{N_{ap}}(i)}], \quad \text{Eq (33)}$$

where A is a constant (e.g., $A=1/\sqrt{N_{ap}}$); and
$\theta_j(i)$ is the phase of the j-th element of v(i), which is:

$$\theta_j(i) = \angle v_j(i) = \tan^{-1}\left(\frac{\text{Im}\{v_j(i)\}}{\text{Re}\{v_j(i)\}}\right). \quad \text{Eq (34)}$$

The normalized steering vector $\tilde{v}(i)$ allows the full transmit power available for each antenna to be used for broadcast transmission.

The columns of the steering matrices generated as described above may also be used as steering vectors for spatial spreading. Other schemes may also be used to generate the set of steering vectors, and this is within the scope of the invention.

The broadcast transmission techniques described herein may be implemented by various means. For example, these techniques may be implemented in hardware, software, or a combination thereof. For a hardware implementation, the processing units used to perform or support broadcast transmission with spatial spreading at the access point and the user terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the broadcast transmission techniques may be implemented with modules (e.g., procedures, functions, and so on) that perform the functions described herein. The software codes may be stored in memory units (e.g., memory units 442 and 482 in FIG. 4 and memory units 842 and 882 in FIG. 8) and executed by a processor (e.g., controllers 440 and 480 in FIG. 4 and controllers 840 and 880 in FIG. 8). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of broadcasting data from a wireless multi-antenna transmitter, comprising:

processing at least one block of data to obtain at least one block of data symbols;
selecting at least two steering matrices for transmission of the at least one block of data symbols, wherein the at least two steering matrices are provided to randomize an effective channel observed by each of a plurality of receiving entities for the at least one block of data symbols;
performing spatial processing on the at least one block of data symbols with each of the at least two steering matrices to obtain a plurality of sequences of transmit symbols; and
broadcasting one or more signals comprising the plurality of sequences of transmit symbols from a plurality of transmit antennas.

2. The method of claim 1, further comprising:
partitioning the at least one block of data symbols into a plurality of subblocks of data symbols;
wherein the selecting at least two steering matrices comprises selecting a steering matrix for each of the plurality of subblocks of data symbols; and
wherein performing spatial processing comprises performing spatial processing for each of the plurality of subblocks of data symbols with a different one of the at least two steering matrices.

3. The method of claim 2, wherein the broadcasting the one or more signals comprising the plurality of sequences of transmit symbols comprises
broadcasting the one or more signals comprising the plurality of sequences of transmit symbols for the plurality of subblocks of data symbols in a plurality of transmission spans, one subblock in each transmission span.

4. The method of claim 1, wherein the processing the at least one block of data comprises, for each block of data,
encoding the block of data in accordance with a coding scheme to obtain a block of coded data,
interleaving the block of coded data to obtain a block of interleaved data, and
symbol mapping the block of interleaved data in accordance with a modulation scheme to obtain the block of data symbols.

5. The method of claim 1, further comprising:
determining a data rate for each of the at least one block of data based on expected channel conditions for the plurality of receiving entities.

6. The method of claim 1, further comprising:
selecting the at least two steering matrices from among a set of L steering matrices, where L is an integer greater than one.

7. The method of claim 1, further comprising:
generating a plurality of steering matrices as unitary matrices having orthogonal columns, and wherein selecting comprises selecting the at least two matrices from the plurality of steering matrices.

8. A wireless multi-antenna transmitter, comprising:
a data processor configured to process at least one block of data to obtain at least one block of data symbols;
a spatial processor configured to perform spatial processing on the at least one block of data symbols with at least two steering matrices to obtain a plurality of sequences of transmit symbols each processed with a different one of the at least two steering matrices, wherein the plurality of steering matrices randomize an effective channel observed by each of a plurality of receiving entities for the at least one block of data symbols; and a plurality of transmitter units configured to broadcast the plurality of sequences of transmit symbols from a plurality of transmit antennas to the plurality of receiving entities in the system.

9. The transmitter of claim 8, wherein the spatial processor is configured to partition the at least one block of data symbols into a plurality of subblocks of data symbols and performs spatial processing on each of the plurality of subblocks of data symbols with a different one of the at least two steering matrices.

10. The transmitter of claim 8, further comprising a controller configured to select the at least two steering matrices from among a set of L steering matrices for each of the plurality of subblocks of data symbols, where L is an integer greater than one.

11. The transmitter of claim 8, wherein each of the plurality of steering matrices includes a plurality of orthogonal columns, and wherein the spatial processor configures the at least one block of data symbols for broadcast via a plurality of spatial channels.

12. The transmitter of claim 8, wherein each of the plurality of steering matrices includes a single column, and wherein the spatial processor configures the at least one block of data symbols for broadcast via a single spatial channel.

13. The transmitter of claim 8, wherein the at least two steering matrices are unitary matrices having orthogonal columns.

14. A wireless multi-antenna transmitter, comprising:
means for processing at least one block of data to obtain at least one block of data symbols;
means for selecting at least two steering matrices for transmission of the at least one block of data symbols, wherein the at least two steering matrices are provided to randomize an effective channel observed by each of a plurality of receiving entities for the at least one block of data symbols;
means for performing spatial processing on the at least one block of data symbols with each of the at least two steering matrices to obtain a plurality of sequences of transmit symbols; and
means for broadcasting the plurality of sequences of transmit symbols from a plurality of transmit antennas.

15. The transmitter of claim 14, further comprising:
means for partitioning the at least one block of data symbols into a plurality of subblocks of data symbols;
wherein the means for selecting the at least two steering matrices are configured to select a steering matrix for each of the plurality of subblocks of data symbols; and
wherein the means for performing spatial processing comprises means for performing spatial processing for each of the plurality of subblocks of data symbols with a different one of the at least two steering matrices.

16. The transmitter of claim 14, wherein the means for broadcasting the plurality of sequences of transmit symbols comprises
means for broadcasting the plurality of sequences of transmit symbols for the plurality of subblocks of data symbols in a plurality of transmission spans, one subblock in each transmission span.

17. The transmitter of claim 14, wherein the means for processing the at least one block of data comprises, for each block of data,
means for encoding the block of data in accordance with a coding scheme to obtain a block of coded data,
means for interleaving the block of coded data to obtain a block of interleaved data, and
means for symbol mapping the block of interleaved data in accordance with a modulation scheme to obtain the block of data symbols.

18. The transmitter of claim 14, further comprising:
means for determining a data rate for each of the at least one block of data based on expected channel conditions for the plurality of receiving entities.

19. The transmitter of claim 14, further comprising:
means for selecting the at least two steering matrices from among a set of L steering matrices, where L is an integer greater than one.

20. The transmitter of claim 14, further comprising:
means for generating a plurality of steering matrices as unitary matrices having orthogonal columns, and wherein the means for selecting comprises means for selecting the at least two matrices from the plurality of steering matrices.

21. A memory unit including stored software codes that are utilized by one or more processors, the software codes comprising:
code for processing at least one block of data to obtain at least one block of data symbols;
code for selecting at least two steering matrices for transmission of the at least one block of data symbols, wherein the at least two steering matrices are provided to randomize an effective channel observed by each of a plurality of receiving entities for the at least one block of data symbols;
code for performing spatial processing on the at least one block of data symbols with each of the at least two steering matrices to obtain a plurality of sequences of transmit symbols; and
code for broadcasting one or more signals comprising the plurality of sequences of transmit symbols from a plurality of transmit antennas.

22. The memory unit of claim 21, wherein the software codes further comprise:
code for partitioning the at least one block of data symbols into a plurality of subblocks of data symbols;
code for selecting a steering matrix for each of the plurality of subblocks of data symbols; and
wherein the code for performing spatial processing comprises codes for performing spatial processing for each of the plurality of subblocks of data symbols with a different one of the at least two steering matrices.

* * * * *